Figure 23:
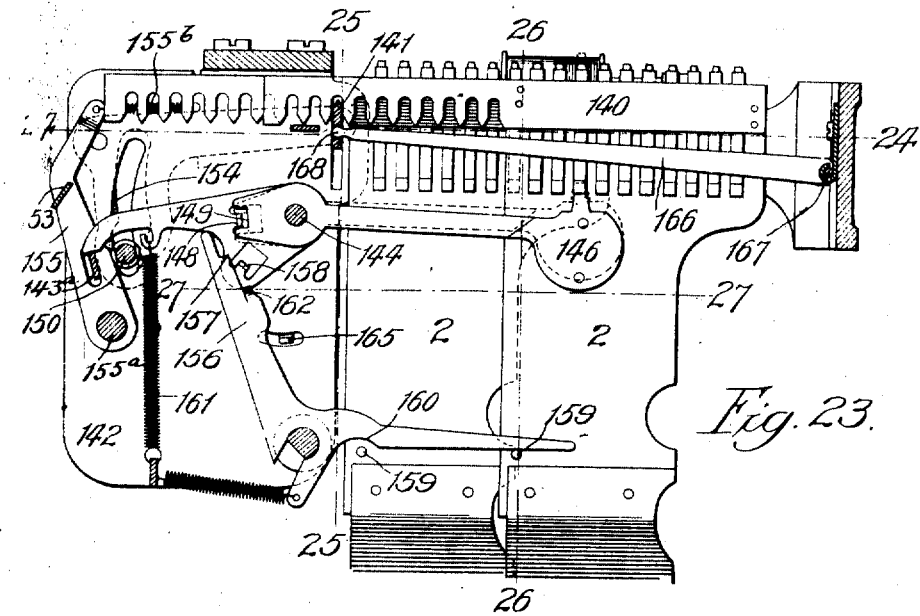

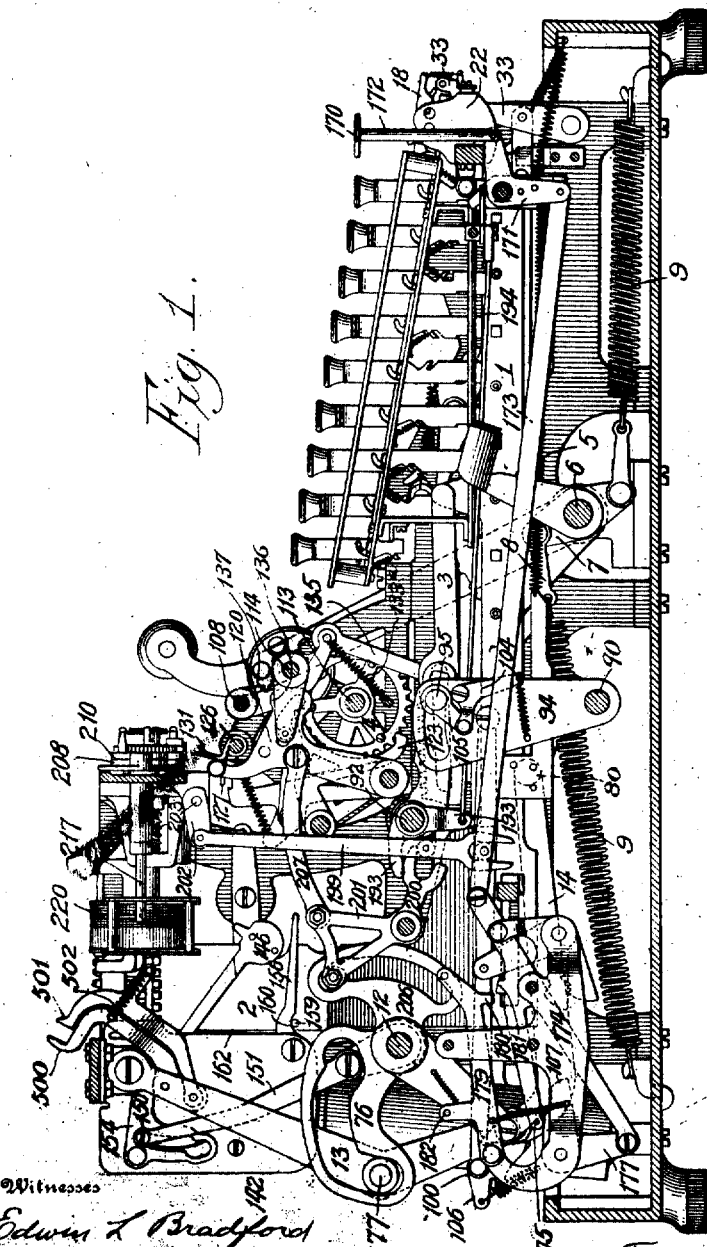

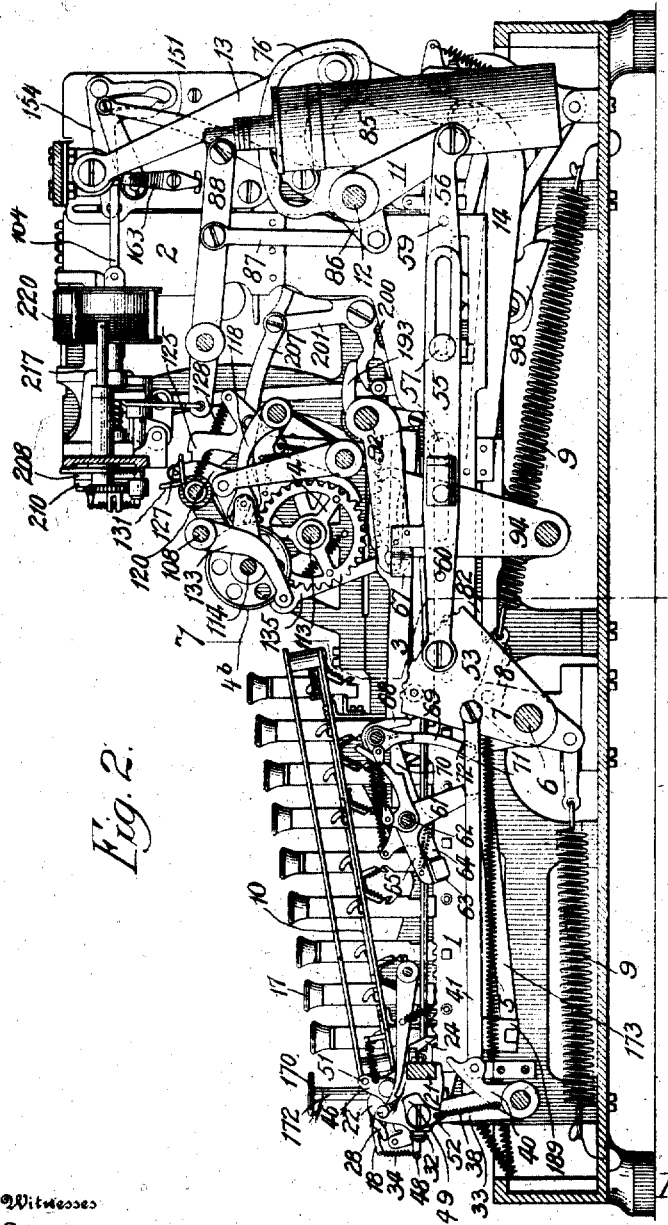

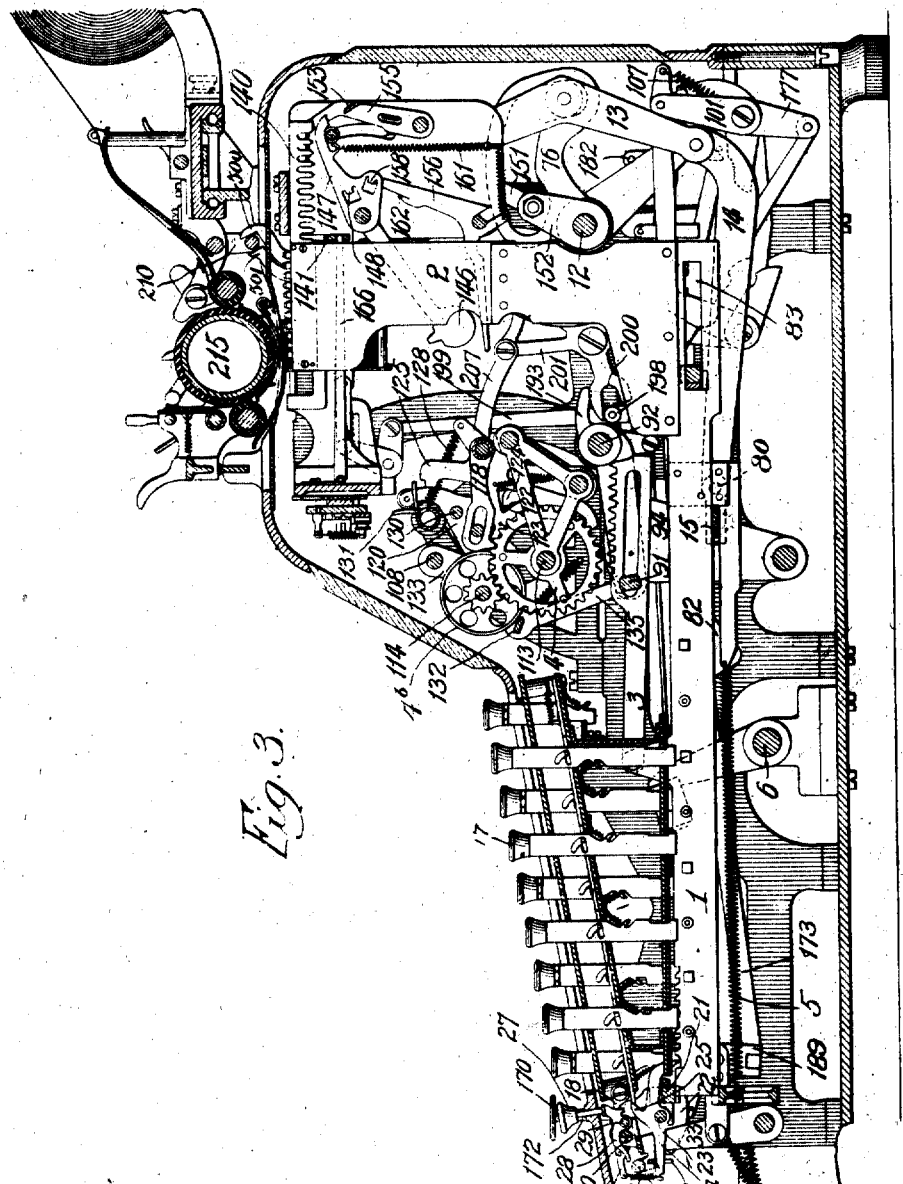

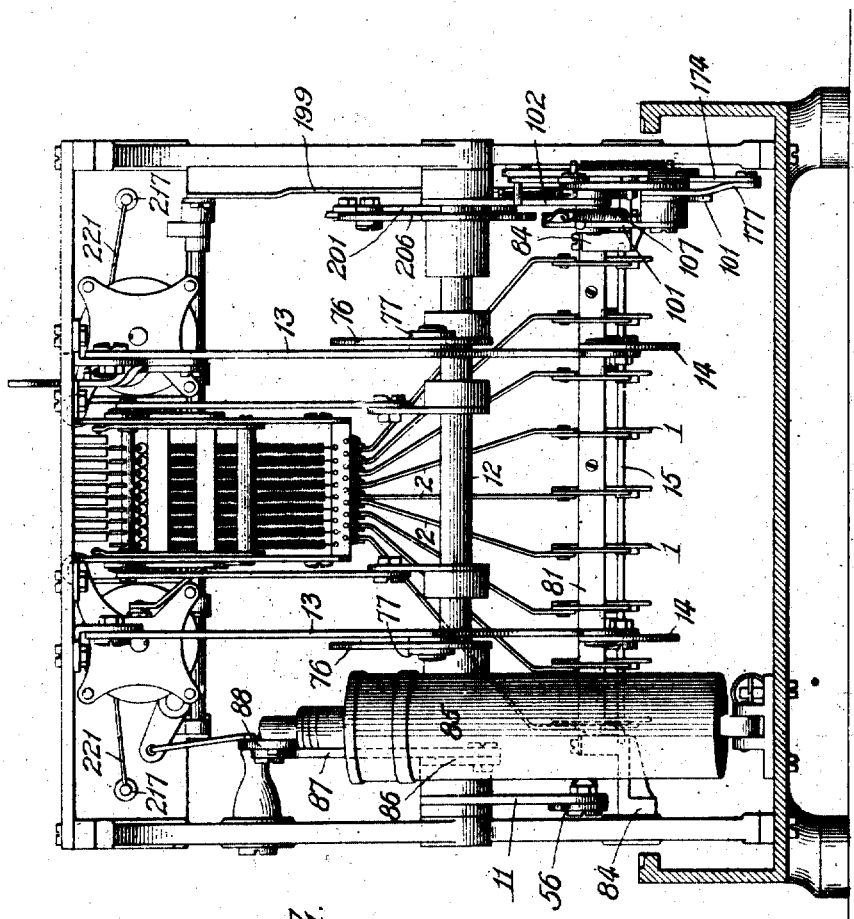

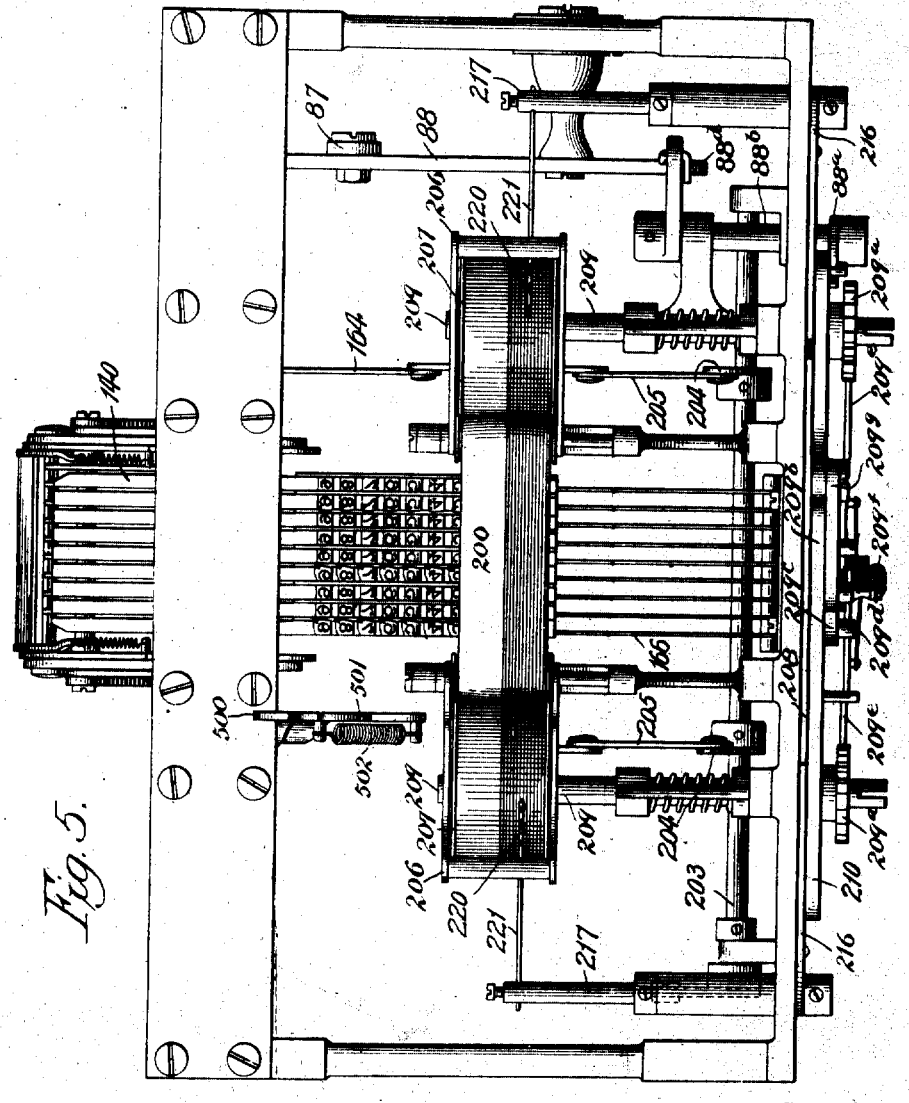

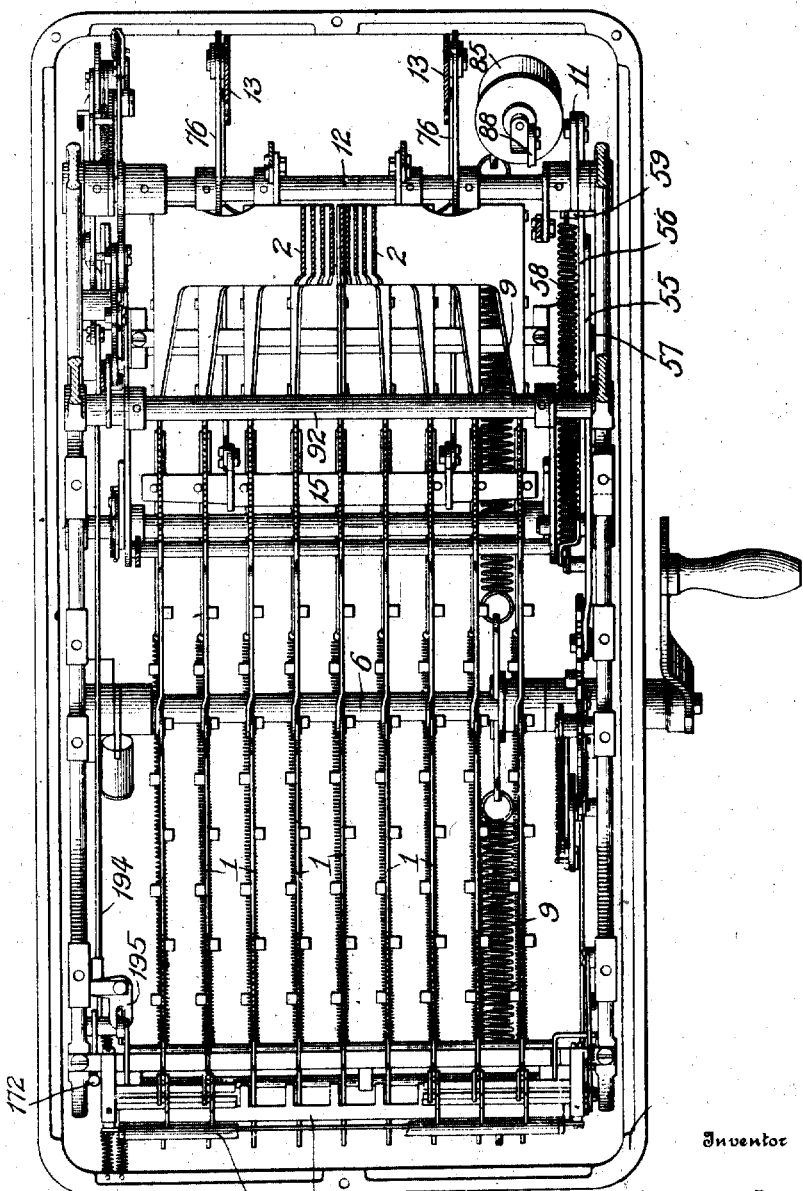

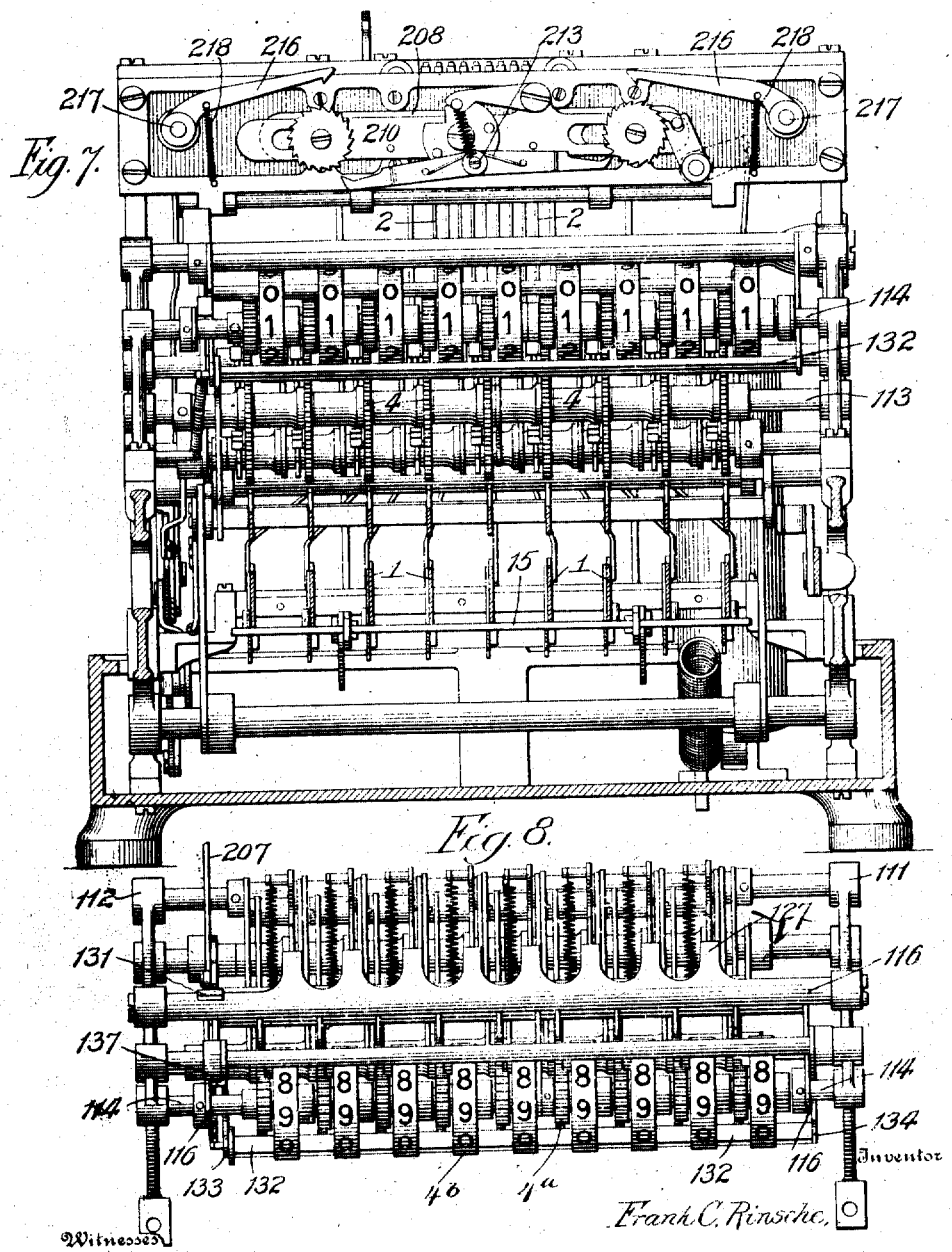

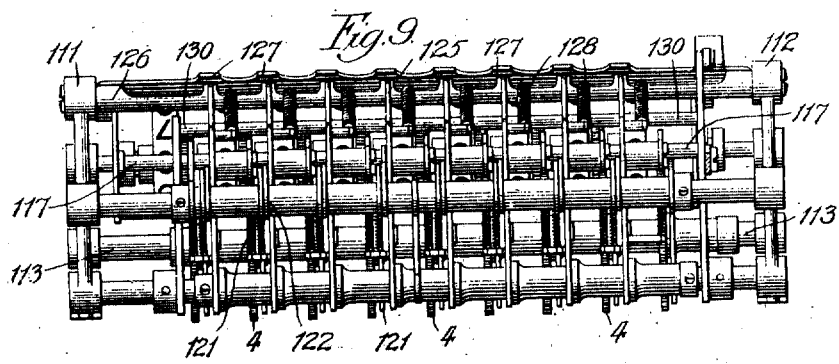
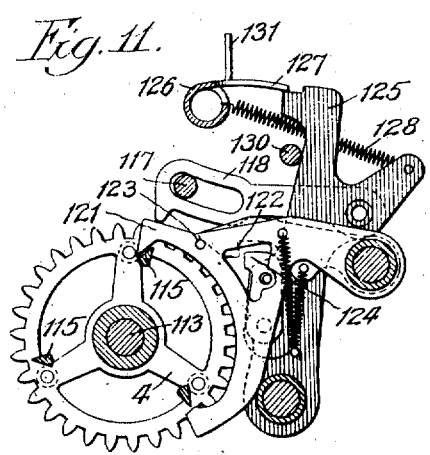
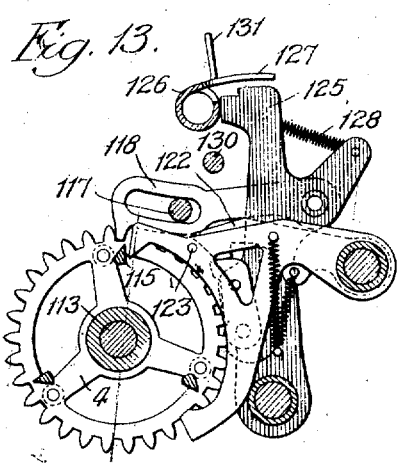
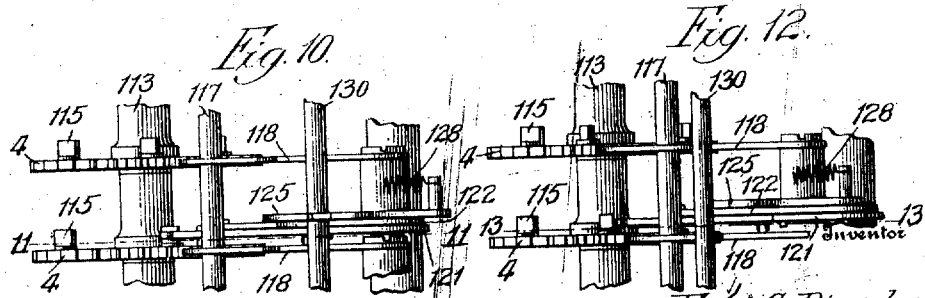

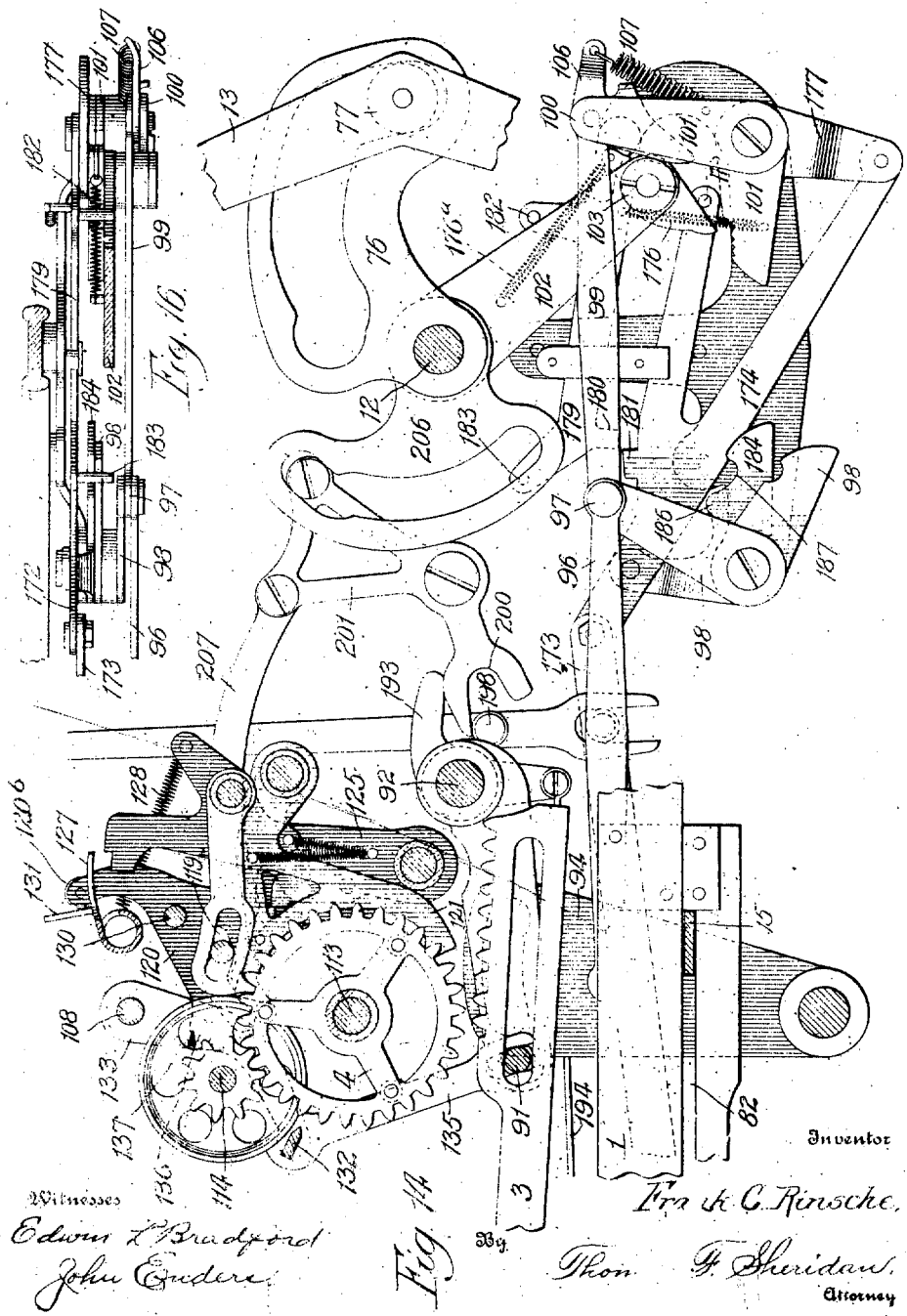

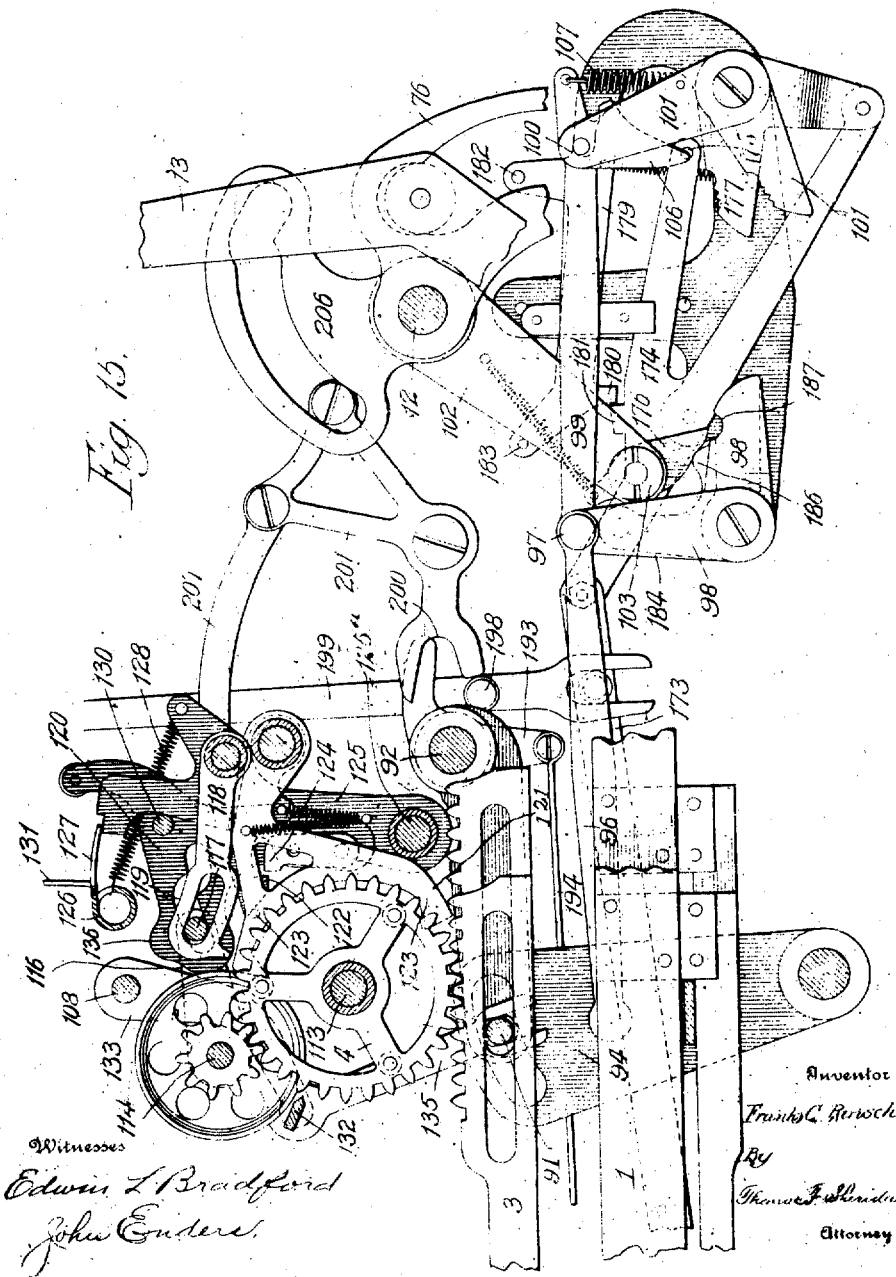

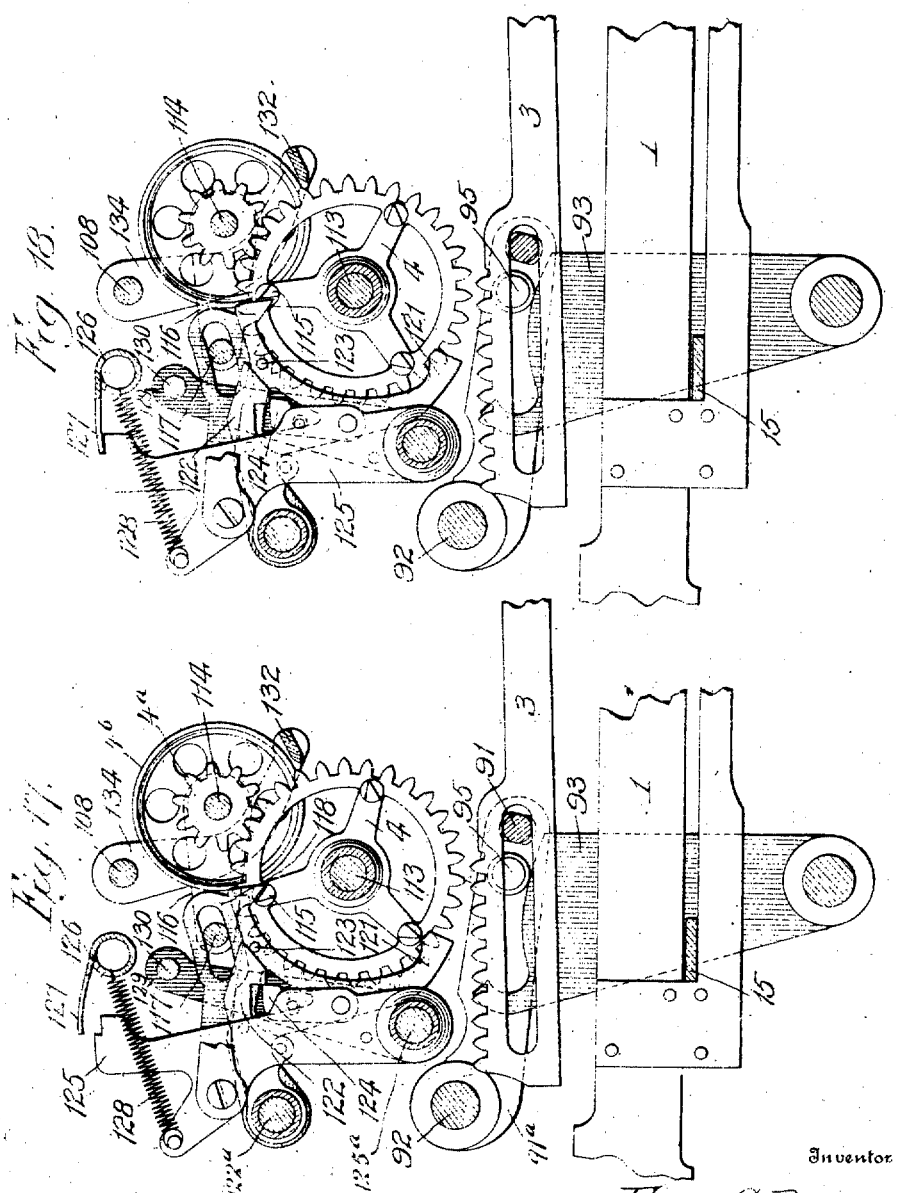

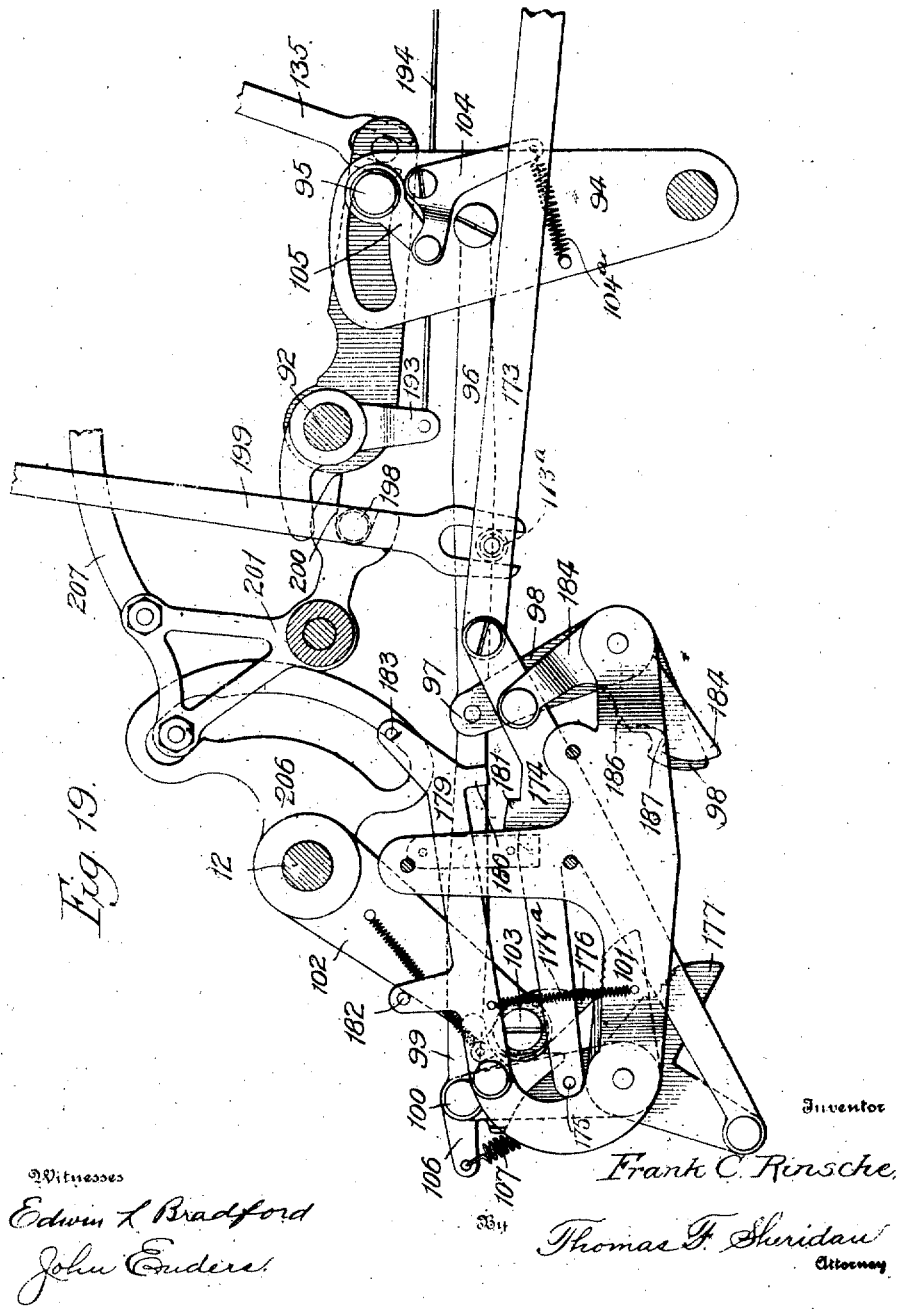

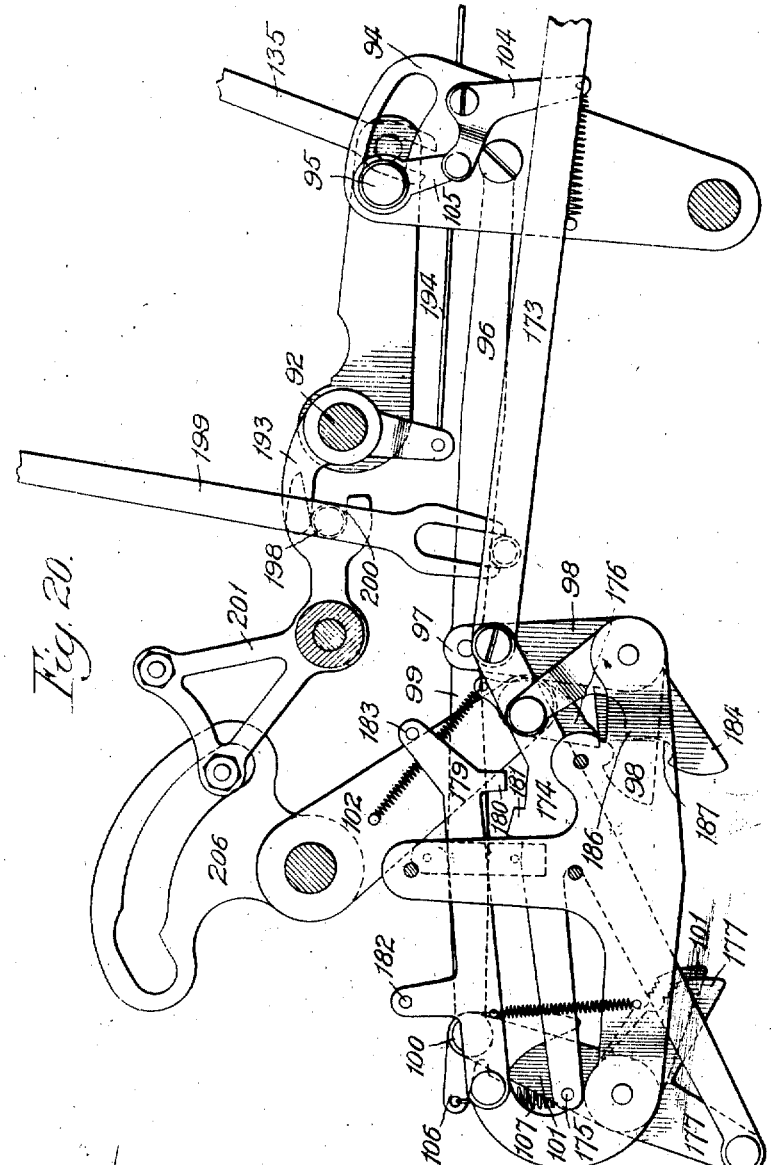

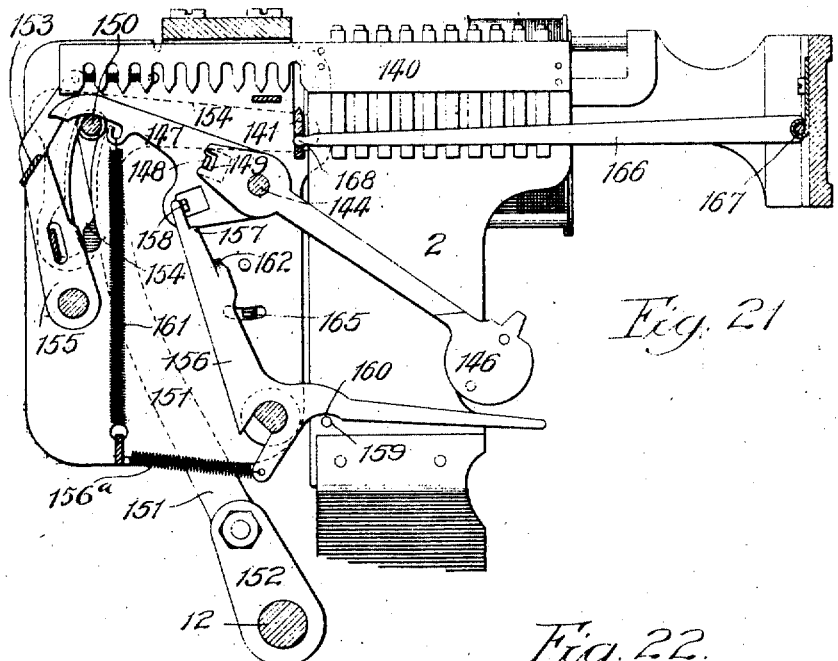
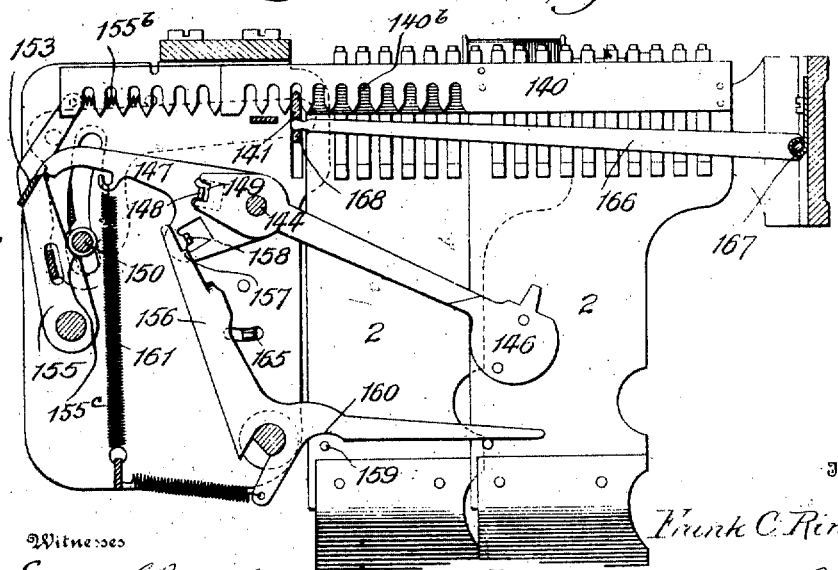

F. C. RINSCHE.
CALCULATING MACHINE.
APPLICATION FILED AUG. 11, 1906.

995,569.

Patented June 20, 1911.
23 SHEETS—SHEET 15.

Witnesses
Edwin L. Bradford
John Enders

Inventor
Frank C. Rinsche,
By Thomas F. Sheridan,
Attorney

F. C. RINSCHE.
CALCULATING MACHINE.
APPLICATION FILED AUG. 11, 1906.
995,569.
Patented June 20, 1911.
23 SHEETS—SHEET 16.
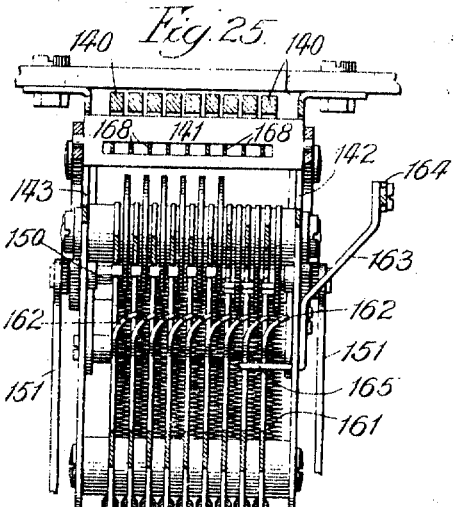
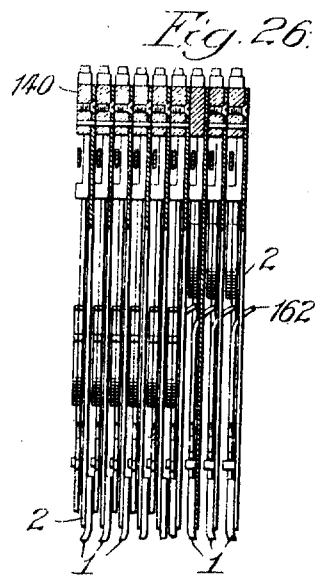
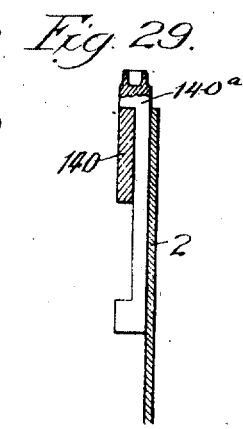
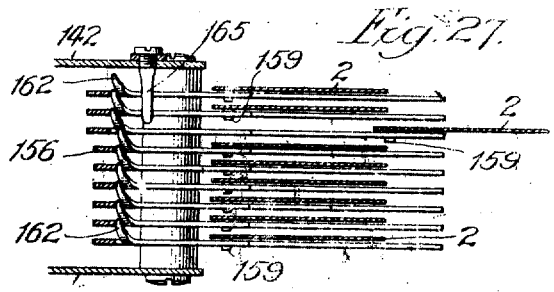
Witnesses
Edwin L. Bradford
John Enders
Inventor
Frank C. Rinsche,
By Thomas F. Sheridan,
Attorney

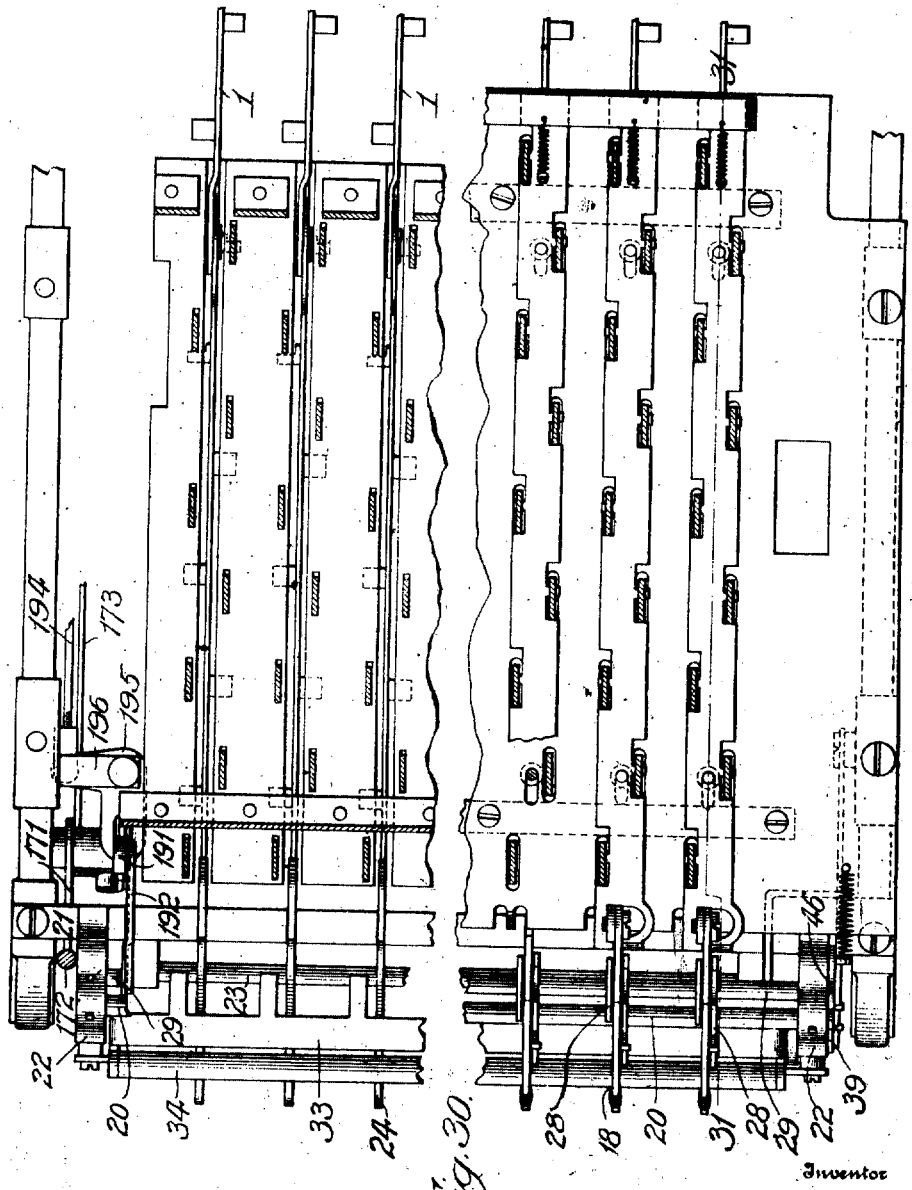

F. C. RINSCHE.
CALCULATING MACHINE.
APPLICATION FILED AUG. 11, 1906.
995,569.
Patented June 20, 1911.
23 SHEETS—SHEET 18.
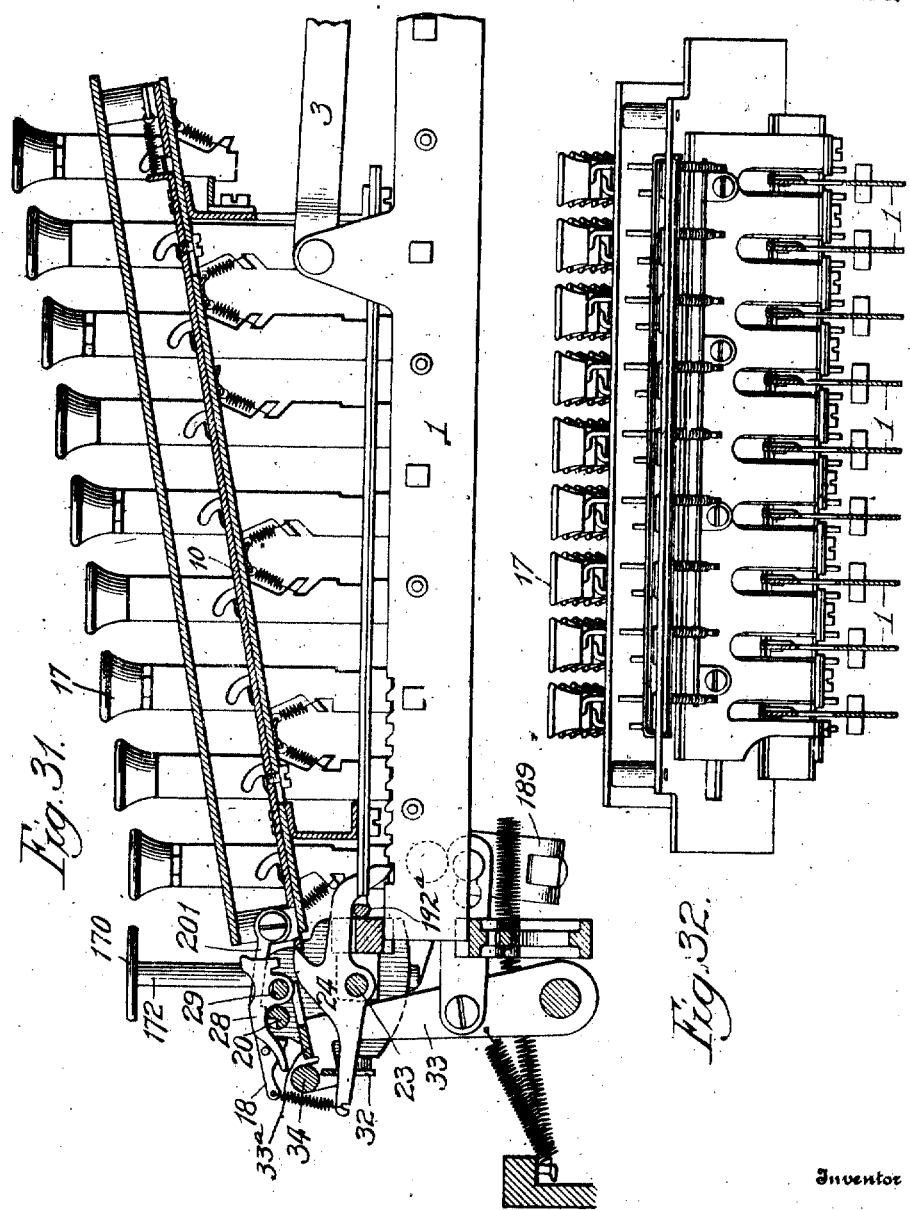

F. C. RINSCHE.
CALCULATING MACHINE.
APPLICATION FILED AUG. 11, 1906.
995,569.
Patented June 20, 1911.
23 SHEETS—SHEET 19.
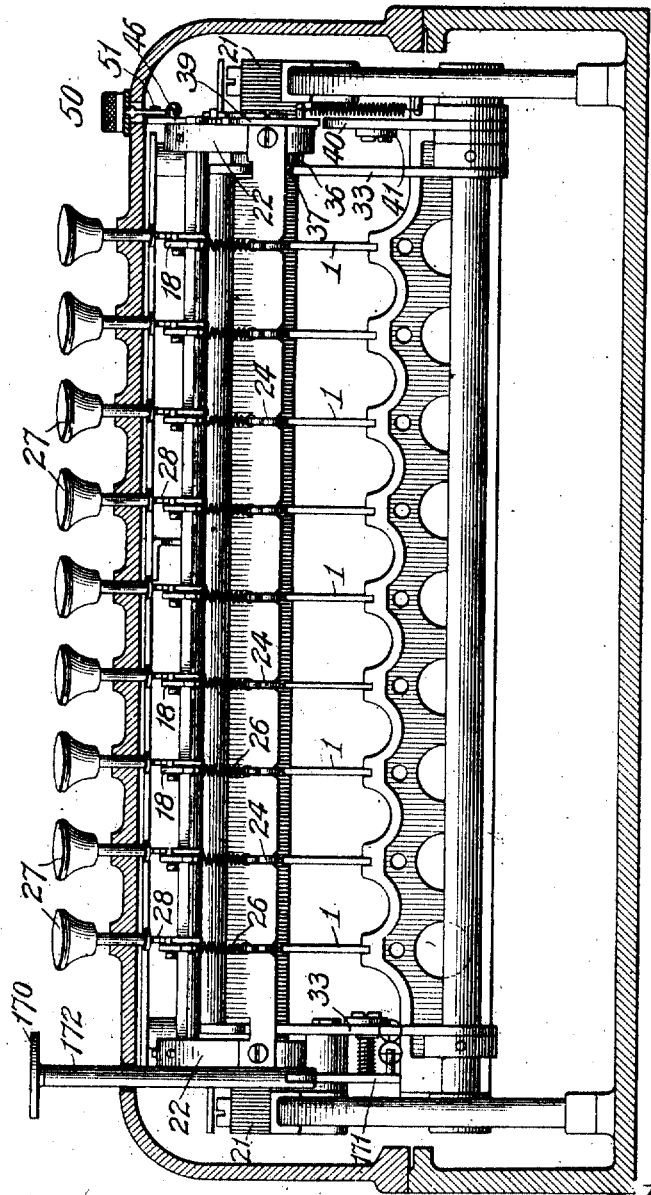
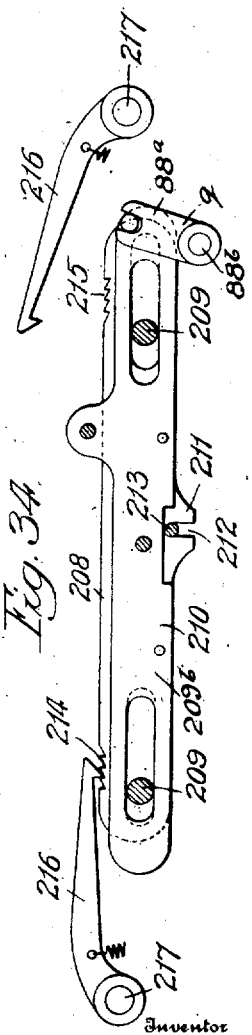
Fig. 34.
Fig. 33.
Witnesses
Edwin L. Bradford
John Enders
Inventor
Frank C. Rinsche,
By Thomas F. Sheridan.
Attorney

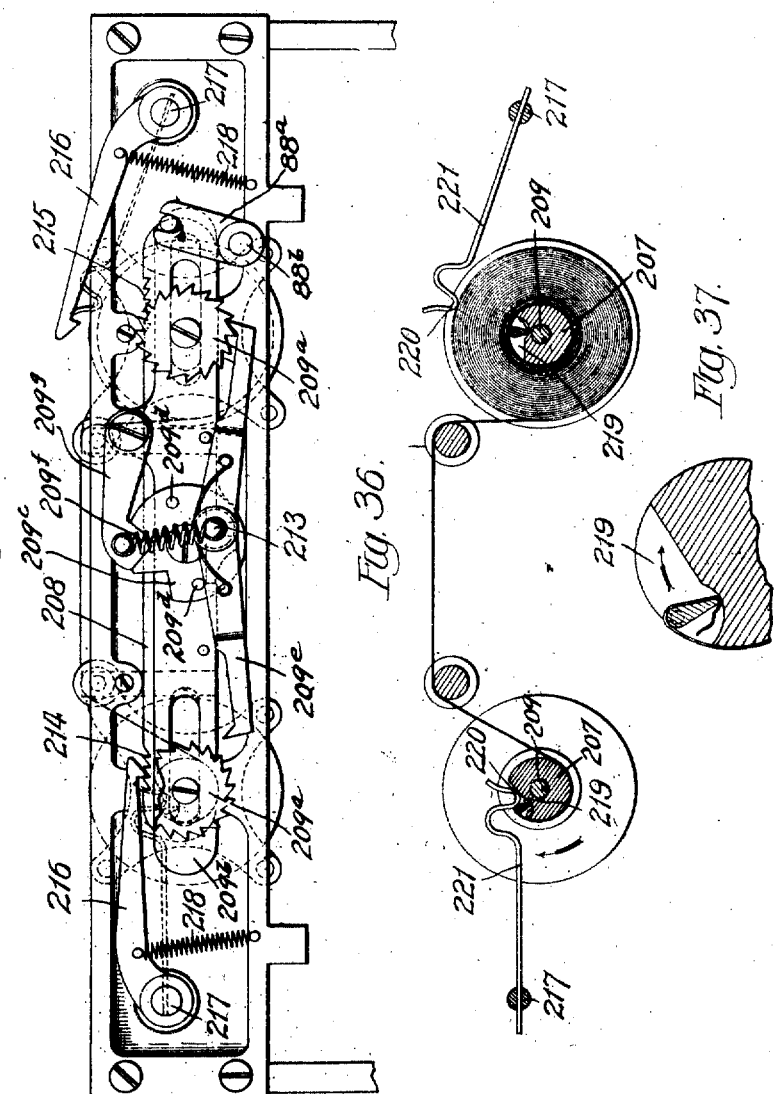

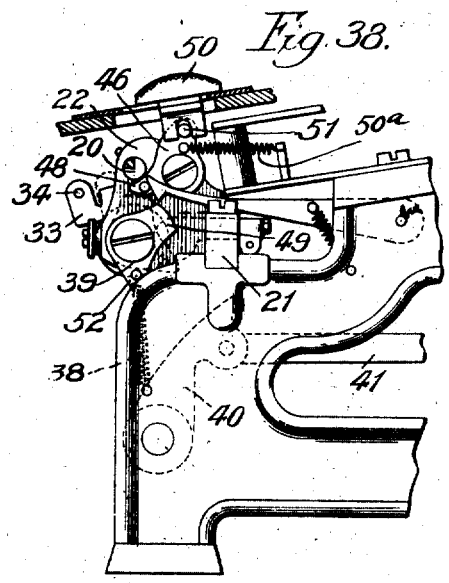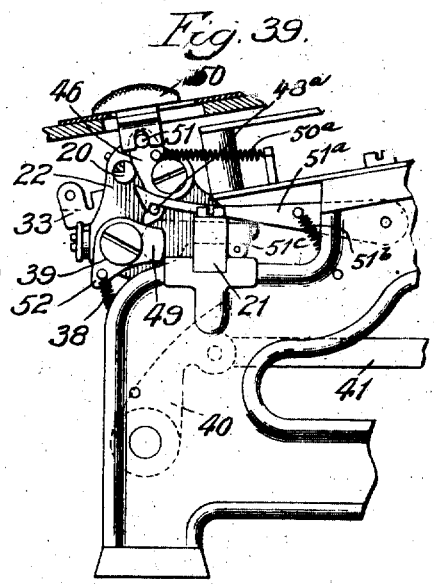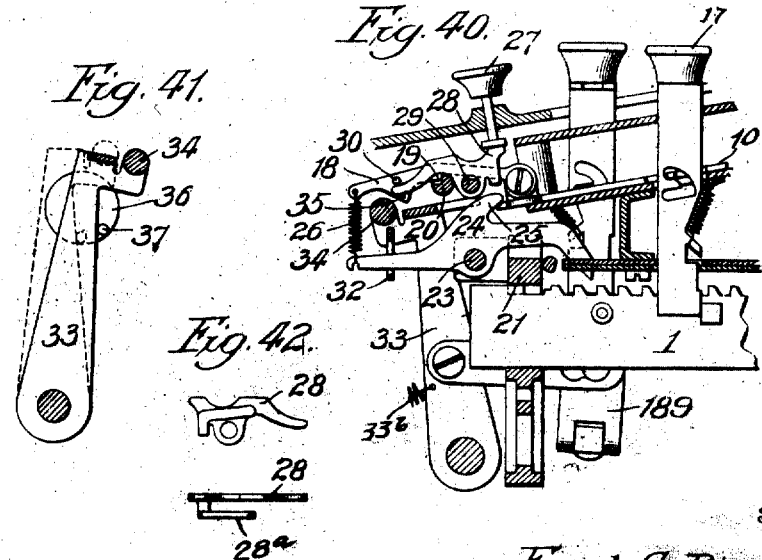

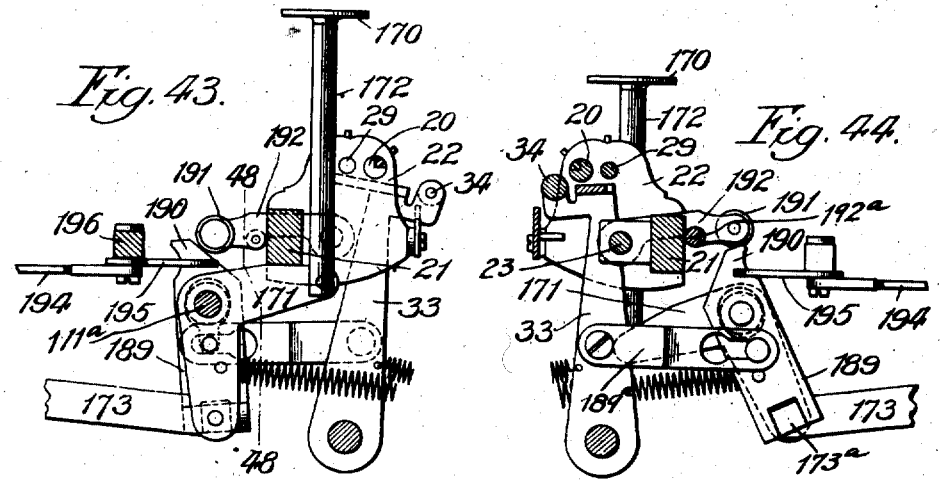

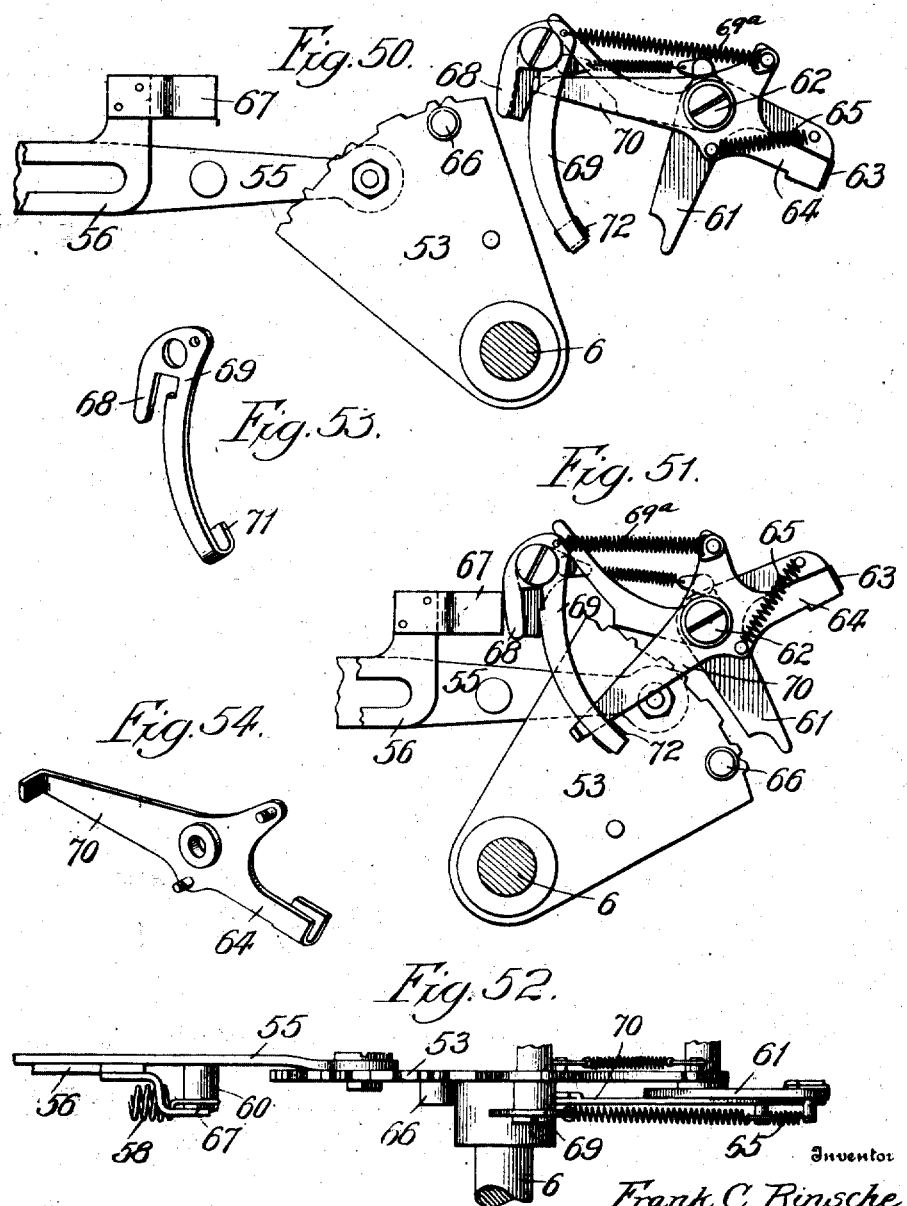

UNITED STATES PATENT OFFICE.

FRANK C. RINSCHE, OF ST. LOUIS, MISSOURI, ASSIGNOR TO UNIVERSAL ADDING MACHINE COMPANY, OF ST. LOUIS, MISSOURI, A CORPORATION OF MISSOURI.

CALCULATING-MACHINE.

995,569.

Specification of Letters Patent.   Patented June 20, 1911.

Application filed August 11, 1906. Serial No. 330,175.

*To all whom it may concern:*

Be it known that I, FRANK C. RINSCHE, a citizen of the United States, residing in the city of St. Louis and State of Missouri, have invented certain new and useful Improvements in Calculating-Machines, of which the following is a specification.

My present invention may be said to constitute a general revision of the calculating machine made the subject of my Patent No. 751,207 issued Feb. 2, 1904, such revision pertaining more especially to the following departments of the machine: (1) The setting-up department generally referred to as the key-board, in which connection the present invention provides an improved form of controlling means for keeping keys depressed for "repeat" operations; (2) the accumulator control department which embraces devices for regulating the periods of engagement and disengagement between adding wheels and their actuators and in this connection the invention provides for effecting that control which results in clearing the wheels, by keeping the total key depressed throughout the operation of the machine and that control which preserves the accumulation or secures a sub-total, by releasing the total key in the middle of the operation, in contra-distinction to the machine of my former patent above identified wherein the reverse was the case; (3) the printing department in which improved polychrome ribbon mechanism is provided and provision made for special printing to denote a clear condition of the machine or the accumulator thereof and in which also provision is made for positively restoring type pieces after the same have been alined and projected against the paper by the action of the hammers; (4) the accumulator actuating department which as heretofore comprises reciprocating members under control of the amount keys and the total key, in connection with which the present invention provides improved means for arresting unnecessary advance of such members upon disconnection of the same from the adding wheels in the taking of a clearing total or in an operation of the machine with the total key depressed and the accumulator already clear; (5) the accumulating or adding department in which connection the present invention provides an improved form of transfer or tens-carrying mechanism and locking means to insure absolute control of the adding wheels by their actuators; and (6) the driving department, wherein the present invention provides improved power transmitting and timing connections between the primary or handle shaft and the counter shaft.

Figure 24:
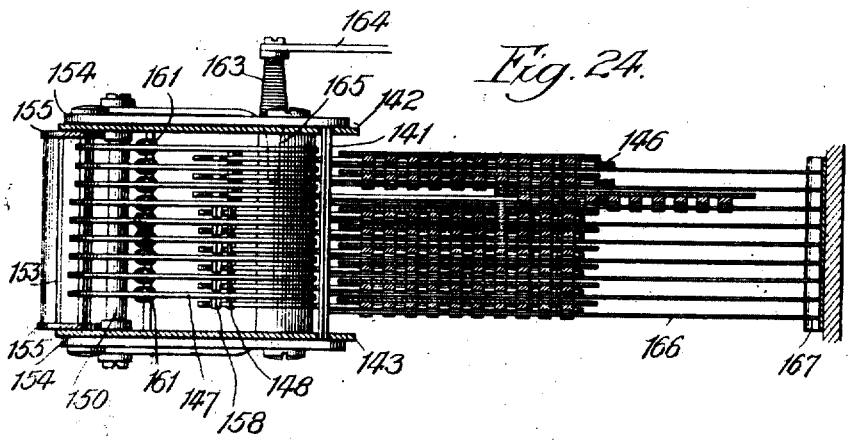

In the drawings which accompany and form part of this specification Figure 1 represents the machine in left side elevation with inclosing casing removed as well as, the left supporting side frame and the paper carriage; Fig. 2 is a similar view from the right hand side; Fig. 3 is a vertical sectional view of the machine looking from the right and including the paper carriage; Fig. 4 is a rear elevation of the machine in the condition depicted in Figs. 1 and 2; Fig. 5 is a top plan view of the rear portion of the machine minus the paper carriage; Fig. 6 is a sectional plan view of the lower portion of the machine including adding wheel actuators and controlling and driving connections; Fig. 7 is a vertical cross section on line 7—7 of Fig. 2; Fig. 8 is a plan view of the accumulator; Fig. 9 is a rear view of the same; Fig. 10 is a plan view of carrying devices; Fig. 11 is a sectional elevation thereof; Figs. 12 and 13 are views similar to Figs. 10 and 11 but illustrating a different condition; Fig. 14 is a sectional elevation looking from the right and showing accumulator control devices at normal; Fig. 15 is a similar view showing the effect of drawing the operating handle of the machine forward; Fig. 16 is a sectional plan view of parts at the lower right-hand portion of Fig. 14; Figs. 17 and 18 are sectional elevations, from the left hand side of the machine, of transfer or carrying mechanism at different stages in an operation; Fig. 19 is a left side elevation of the accumulator controlling devices shown in right side elevation in Figs. 14 and 15 but in changed condition as a result of depression of the total key; Fig. 20 is a view similar to Fig. 19 but with the condition of parts further changed as the result of drawing the operating handle forward; Figs. 21, 22 and 23 are similar vertical sections of the printing mechanism illustrating different conditions; Fig. 24 is a horizontal section on the line 24—24 of Fig. 23; Fig. 25 is a vertical section on the line 25—25 of Fig. 23; Fig. 26 is a vertical cross section on the line 26—26 of Fig. 23; Fig. 27 is a horizontal section on the line 27—27 of Fig. 23; Fig. 28 is a horizontal section on an enlarged scale of one of the type carriers appearing in Figs. 21 to 27; Fig. 29 is a vertical section of said type carrier; Fig. 30 is a horizontal section of the front portion of the machine, partly in a plane just above the bottom guide plates for the keys and partly on a plane between the upper guide plates through which the keys extend; Fig. 31 is a vertical section on line 31—31 of Fig. 30; Fig. 32 is a rear elevation of the keyboard; Fig. 33 is a sectional front elevation of the machine; Fig. 34 is a sectional detail of ink ribbon mechanism; Fig. 35 shows the ink ribbon mechanism in elevation; Fig. 36 is a sectional detail of ink ribbon devices; Fig. 37 is a fragmentary section of a ribbon spool; Figs. 38 and 39 are sectional elevations of the front portion of the machine viewed from the right, the views differing in showing different adjustments of the repeat key; Fig. 40 is a vertical section of the front portion of the machine illustrating a condition resulting from depression of an amount key and pulling forward of the operating handle; Fig. 41 is a sectional detail of amount key releasing devices; Fig. 42 shows side and top views of the key releasing device; Fig. 43 is a sectional elevation of total key mechanism at the front of the machine viewed from the left; Fig. 44 is a sectional elevation of said mechanism viewed from the right and with the total key depressed; Fig. 45 is a top plan view of this mechanism; Fig. 46 is a sectional elevation looking from the right as in Fig. 44 but taken on a line farther to the right, the total key being depressed as in Fig. 44; Fig. 47 is a similar view with the total key still depressed but representing a changed condition resulting from pulling forward the operating handle; Fig. 48 is a vertical section taken on the line 48—48 of Fig. 43 and Fig. 49 is a similar view but with conditions changed as the result of drawing forward the operating handle with the total key depressed; Fig. 50 is a left side elevation of drive devices at normal; Fig. 51 is a similar view with conditions changed as the result of pulling the operating handle forward; Fig. 52 is a top plan view of the parts as they appear in Fig. 50 and Figs. 53 and 54 are perspective details of devices shown in Figs. 50 to 52.

In the matter of general organization the machine of the present invention is very similar to that of my aforesaid prior patent, amount keys being arranged in rows extending from front to rear at the fore part of the machine, registering wheels showing just in rear and above the amount keys and a paper carriage being located still farther to the rear with its platen over an ink ribbon under which ribbon type carriers are adapted to be variously positioned for setting up amounts to correspond with numerals of depressed keys. The latter measure excursions of slide bars which are united to the type carriers and which carry racks for turning the registering wheels. At the right of the machine there is the usual operating handle which after depression of amount keys is pulled forward and released with the result that slide bars advance, printing is done and the slide bars restored to normal registering the amounts upon the wheels. Then there is a special key located at the left of the keyboard the depression of which special key followed by a pull of the operating handle causes slide bars to advance with their racks engaged with the wheels so as to turn the latter back to zero in which connection the total which the wheels had been exhibiting is printed, and there are provisions for either leaving the wheels at the zero position or turning them forward again to again exhibit the total.

In the accompanying drawings the slide bars are designated by the numeral 1, the type carriers in the form of upright plates secured to said slide bars by the numeral 2, the racks pivotally mounted upon the slide bars by the numeral 3, the adding gear wheels which coöperate with said racks, by the numeral 4, the springs which are normally under tension to advance the slide bars, by the numeral 5, the primary operating shaft to which the handle is applied, by the numeral 6, and main motor springs by the numeral 9 (Figs. 1 and 2) said springs being anchored to the base of the machine and coupled by links 8 to oppositely extending crank arms 7 respectively on said shaft 6, it being understood of course that as usual in machines of this class forward pull of the operating handle is in opposition to such springs which upon release of the handle restore it and the various moving parts to normal.

*Keyboard mechanism.*—The depressible amount keys are designated by the numeral 17 and are arranged as usual to slide vertically through slotted guiding plates and being normally upheld by springs and whose stems at their lower ends constitute stops for lugs on the slide bars 1 to abut. Each denominational row of series of keys has its customary slide plate 10 which through cam slot and pin engagement with the key stems will be slid forward whenever a key is depressed. The detent arrangement for holding the key depressed is similar to that disclosed in the Treadway Patent 718,176 issued Jan. 13, 1903. Thus there is pivoted to the front end of each plate a latch or detent 18 which extends over a shouldered cross rod 20 and is spring drawn downward so that when the plate is slid forward by depression of a key the catch portion 19 of the latch will snap over the shoulder of the cross rod. In the top edge of each slide bar 1 near the front there is a notch and normally the bars are restrained from forward movement by the engagement in the notches of the down-turned points of pawls 24 which are independently journaled upon a rock shaft 23 and connected by springs 26 with the latches 18, the springs, in addition to enforcing engagement of the latches with the cross rod 20, also serving to enforce engagement of the pawls with the notches of the slide bar 1, a condition illustrated in Figs. 3 and 31. The pawls 24 have upwardly and rearwardly projecting portions 25 confronting the forward ends of the slide plates 10 so that whenever a slide plate is advanced by depression of a key it will disengage the associated pawl 24 from its slide bar 1 so that the latter may thereafter advance when the handle of the machine is pulled, see Fig. 40.

Now in the interest of speed or operation, which is of great importance to the use of machines of this class, I make special provision for correction of errors that are bound to occur in depression of amount keys. To this end I arrange at the very front of the machine, where they can be most conveniently manipulated, a transverse row of keys 27 sliding vertically through the casing of the machine and having feet to bear upon the rear arms of small levers 28 independently journaled upon a cross rod 29 and arched over the cross rod 20 and forward thereof formed as curved fingers which extend under studs 30 on the latches 18. It will be obvious by reference to Fig. 40 that if an amount key has been erroneously depressed in a certain order or denomination the touching of the key 27 just in front of that particular order or row of keys will result in immediate release of the key by reason of the tilting of the lever 28 and lifting of the latch 18 through engagement of the lever with the stud 30, the plate 10 moving rearward while the stud 30 rides along the upper curved edge of the lever. It will be understood that as usual the plates 10 are drawn rearward by springs. Thus in the event of error in only one row or denomination it will not be necessary to use the common form of error or correction key which releases the entire set of depressed keys. The levers 28 have laterally spaced portions 28ª (Figs. 30 and 42) between which and the main portions of said levers lie the latches 18 for guiding purposes and to preserve the proper relation between latches and releasing levers.

Restoration of depressed amount keys as a part of the regular operation of the machine, and of course independently of the correction keys 27, is effected by a swinging bail comprising side arms 33 (Figs. 1, 2, and 38 to 41) and a cross rod 34 adapted to act upon cam projections 35 of the latches 18, said bail also comprising a cross bar 33ª with rearwardly projecting fingers to act upon the ends of the plates 10 to positively restore them and elevate the depressed keys. Said bail is normally held forward by a spring 33ᵇ and is rocked rearward by a crank pin 37 on an oscillatory disk 36, Fig. 41, journaled in a bracket 22 of the framework and having secured to its journal or arbor 39 a right angle piece comprising arms 49 and 52, the latter connected by a spring 38 to a lower portion of the frame of the machine to hold it normally central as shown in Fig. 38. An arm 40 (Figs. 2, 38 and 39) journaled on the rock shaft of bail 33 is connected by a link 41 to an operating sector 53 fastened to the main drive shaft 6 as shown in Fig. 2 and oscillation of the arm 40 which accompanies oscillation of said sector will first swing the short arm 52 forward to such position as shown in Fig. 39 and wipe past the same allowing it to return to its central position shown in Fig. 38 and then when the arm 40 returns it will swing the arm 52 rearward and again wipe past it. The initial swing of the arm 52 turns the disk 36 in a direction to carry the crank pin 37 forward away from the bail 33 whereas the final or rearward swing of the arm 52 causes said crank pin to act against the front edge of the right side bar of the bail and swing the latter rearward to release the depressed keys in the manner described, the arm 40 of course passing by the arm 52 so that the bail restores to normal.

In order to provide for repeated operations with the same amount keys depressed it is only necessary to disable the crank disk 36. To this end a slide key 50 is arranged at the lower right hand corner of the keyboard, its stem passing through a slotted cover plate and a slot in the casing, said stem being bifurcated to embrace a stud 51 on one arm 46 of a bell crank lever pivoted to the bracket 22 as shown in Figs. 38 and 39, the other arm 48 of said bell crank lever being adapted to engage the arm 49 of the aforesaid right angle piece when the key 50 is slid forward. Normally the key is rearward as shown in Fig. 38 and does not interfere with the action of the right angle piece and the crank disk 36. When slid forward the arm 48 of the bell crank lever rocks the right angle piece, as shown in Fig. 39, to a position where its arm 52 is out of the path of travel of the arm 40, in consequence of which there will be no oscillation of the disk 38 to swing the bail 33 and the amount key will remain depressed. It should be noted that the end of the arm 49 is relatively wide so that when swung forward by the arm 40 it will not pass by the arm 48 but continue to block the same when the repeat key is at normal (Fig. 38) thereby preventing operation of that key while the handle is returning and a lock-up that might otherwise occur by engagement of the arm 48 with the rear side of the arm 49. A spring 50ᵃ tends to restore the repeat key but is prevented from so doing by a hook 51ᵃ which when the key 50 is slid forward snaps over a stud 48ᵃ on the arm 48 of the bell crank lever as shown in Fig. 39. A spring 51ᵇ enforces this locking engagement and the disengagement is effected by a releasing arm 51ᶜ engaging under the arm 51ᵃ and secured to the rock shaft 23 which forms part of a bail operated by the total key as hereinafter explained.

Simultaneous release of a number of depressed amount keys for correction purposes may be effected at any time by depression of the total key 170 and simultaneously the repeat key will be released so that it is not necessary to separately release the amount keys and the repeat key and danger of registering the "repeat" amount once too often is avoided. Of course the chief function of the aforesaid key 170 is that of operating controlling devices for taking totals and sub-totals which matter will be made the subject of a separate chapter. For the present it will suffice to point out the connections whereby said key performs correction and release functions such as above noted. The stem 172 of this key slides through the casing and as shown in Figs. 43 and 44 is jointed to the forward extending arm of a bell crank lever 171 pivoted upon a stud 171ᵃ, its downward extending arm being jointed to a link 173 and carrying a block 173ᵃ to which is pivoted a blade 189 extending upward and loosely embracing the stud 171ᵃ to permit of lateral swinging for a purpose hereinafter described and not concerned with the function of the key 170 now being treated. This concerns only the swinging of the blade 189 which accompanies rocking of the bell crank lever 171 by depression of said key. Such motion is communicated to the releasing bail 33 through the medium of a link 189ᵃ which is pivotally connected to the left side arm of the bail and is slotted to embrace a stud on the blade 189. The slot is of course necessary in order to provide for the ordinary rocking of the bail in operations of the machine, without affecting the totaling connections. Normally the stud is at the rear end of the slot as shown in Fig. 44, and obviously depression of the key 170 results in swinging the bail 33 rearward and releasing any depressed keys. At the same time a cam end 190 of the blade 189 acts upon a roller 191 on the extended left side arm 192 of the aforesaid bail of which the shaft 23 forms a part. Thus this bail is lifted and the arm 51ᶜ which constitutes the other side of it, is raised disengaging the hook 51ᵃ from the repeat lever 46-48.

*Accumulator control.*—Normally the racks 70 are down out of engagement with the adding gears 4 as shown in Fig. 3, the cam sectors 94 and 94ᵃ being rearward as shown in Figs. 1 and 2. These sectors are fastened to a rock shaft 90 so that they operate in unison upon rollers 95 on side arms 91ᵃ of a bail having a cross rod 191 extending through longitudinal slots in the racks as shown in Figs. 17 and 18, this being substantially the arrangement in my aforesaid prior patent though only the left hand sector 94 here has the closed cam-slot. In any operation of the machine without the total key depressed the cam sectors are rocked forward just as the operating handle concludes its initial stroke, so that the slide bars 1 and racks 3, having been checked by the keys, the racks will then be engaged with the gear wheels 4. Then this condition continues during the back stroke of the operating handle until just at the conclusion thereof the cam sectors are rocked back to their initial position disengaging the racks from the wheels. This is effected through the medium of a link 96 which connects the left sector 94 with the upwardly extending arm of a bell crank lever 98 at the rear part of the machine as shown in Figs. 1 and 14, said arm of the bell crank being connected by a link 99 with a somewhat similar bell crank lever 101. Normally the parts are as seen in Fig. 14 the upwardly extending arms of the bell crank levers 98 and 100 being inclined rearward and an operating arm 102 having a roller stud 103 adjacent the bell crank lever 101. The operating arm 102 is secured to a rock shaft 12 which is the secondary operating shaft of the machine and is oscillated in every operation being linked to the primary shaft 6 in a manner hereinafter described so that when the handle is pulled forward the arm swings forward. As this forward swing terminates the stud 103 strikes the bell crank lever 98 and throws it forward thereby shifting the cam sectors 94 and 94ᵃ with the effect above described. Then when the handle goes back of course the operating arm 102 swings rearward. As it reaches the end of its rearward swing it operates upon the rear bell crank 101 and shifts the cam sectors back to normal disengaging the racks from the wheels. In these operations the upwardly extending arms of the two bell cranks serve as radius links or bars and the bell crank characteristic does not come into play. For the purpose of cushioning the back stroke when the arm 102 is to act upon the rear bell crank 101, I preferably mount upon the pivot connecting the link 99 with said bell crank, a plate 106 held forward by a spring 107 so that the stud 103 strikes this plate instead of the bell crank itself.

The bell crank characteristic above alluded to does come into play when totals are taken. There is pivoted upon the operating arm 102 a reversible pawl 176 which a spring 176ª tends to hold central or in line with the arm. This pawl is adapted to act upon the bell cranks for the purpose of shifting them in different time than they are shifted in an itemizing operation for it will of course be understood that in a totaling operation the engagement of the racks and wheels must occur at the outset and in the case of a clearing total the racks and wheels out of engagement while the handle goes back. The spring 176ª is of course normally tending to engage the pawl with the horizontal arm of the bell crank 101, see Fig. 14. That arm is serrated in its upper edge as illustrated so that the pawl may readily take effect thereon to rock the bell crank. Normally, however, the pawl is restrained by engagement thereunder of a stud 175 on one branch of a forked thrust piece 174 which is coupled to the rear end of the link 173. (It will be remembered that this link 173 is connected at its forward end to the total key bell crank 171). It results that when the total key is depressed and the thrust piece 174 carried rearward the said pawl becomes engaged with the horizontal branch of the bell crank lever 101 and therefore as soon as the arm 102 starts forward the pawl will rock the bell crank and engage the racks with the wheels. Having done so the pawl will disengage itself from the bell crank out by turning on its own pivot and after straightening under the impulse of its spring 176ª will, as the arm 102 reaches the end of its forward stroke wipe, over the horizontal arm of the bell crank lever 98 as shown in Fig. 15 and unless prevented from so doing will, upon the start rearward of the arm 102 engage in a notch 187 of said bell crank lever and rock the same much as it rocked the bell crank lever 101 at the beginning of the operation, thereby disengaging the racks from the wheels. However, this should only occur if the total is to leave the accumulator clear and as stated in the beginning, this occurs when the total key is held down throughout the operation. If the total key is released with the operating handle forward then its restoration will prevent effective engagement between the pawl 176 and the bell crank 98. This also is illustrated in Fig. 15.

There is pivoted to an upper forward portion of the thrust piece 174 a bell crank 184 which is concentric with the bell crank 98 and has a lower branch lying alongside the lower branch of said bell crank 98 and similarly notched to but in addition it is formed just forward of the notch with a hump 186. The pawl 176 is broad enough to engage both bell cranks and hence if the bell crank 184 is normal this pawl will ride upon the hump and be thereby prevented from engaging in the notch 187 of the bell crank 98. However, if the total key is held down as in Fig. 20 the pawl will be permitted to engage said notch and shift the parts to disengage the racks and wheels. Otherwise they will remain engaged and the wheels will be turned forward to re-register the total, this being what is commonly known as a subtotal operation. In order to insure complete operation of the totaling connections at the outset, an additional bell crank 177 is mounted upon the same pivot stud as the bell crank 101 and normally has one of its arms lying alongside of the horizontal arm of said bell crank 101, this arm of the bell crank 177 being serrated in its upper edge similarly to the arm of said bell crank 101. The thrust piece 174 is coupled to the other arm of said bell crank 177. The result is that when the total key is depressed the pawl 176 becomes engaged with the arm of the bell crank 177 in addition to becoming engaged with the bell crank 101 and so if the key is not fully depressed or not kept down by the operator as he pulls the handle forward it will be fully depressed and held down by reason of the action of the pawl 176 upon the bell crank 177.

In order to lock the total key down and also lock it against depression if the operation is an itemizing one, a locking bar, 179 is pivoted to the bracket which supports the several bell cranks above described, this locking arm having a lug 180 elevated to engage in front or in rear of a lug 181 on the thrust piece 174. This locking arm has an upstanding projection near its rear end with the stud 182 extending in the path of the operating arm 102, and the locking arm has a forward extension with a stud 183 on the opposite side of the arm 182. Normally the arm 102 engages the stud 182 holding the locking arm up as shown in Fig. 14. As soon as the arm 102 starts forward the locking lever drops so that its lug 180 engages behind the lug 181 and will prevent depression of the total key. If the total key has been depressed before pulling the operating handle then of course the lug 180 will drop in front of the lug 181 from the position shown in Fig. 19. Then at the end of the forward swing of the arm 102 it will strike the stud 183 and lift the locking arm so that the total key may be restored. The lug 181 is made higher at the rear side of the front so that in an itemizing operation it will remain engaged by the lug 180 notwithstanding the locking arm 179 is raised by encounter of the arm 102 with the stud 183.

A spring 179ᵃ is preferably employed to enforce engagement between the locking arm and the thrust piece 174.

In order to guard against the possibility of a rebound of the sectors 94 and 94ᵃ when thrown forward to engage the racks with the wheels, I mount upon the journal of the roller 95 a toggle link 105, Figs. 19 and 20, and pivot upon the sector 94 a toggle link 104 jointed to the link 105 and having its oppositely extending arm connected by a spring 104ᵃ to the sector 94. It will be seen that forward swinging of sector 94, by raising the bail 91—92, causes a partial straightening of the toggle joint so that there will be resistance to rebound especially as the spring 104ᵃ exerts itself to keep the toggle so partially straightened.

*Preventing discharge of slide bars in totaling.*—Of course when a total is to be taken all of the slide bars 1 must be released and as in clearing the machine the racks disengage from the wheels at a time when the slide bars are not restrained except by the wheels, all of the bars will jump to the limit of their spring movement unless some arresting means come into play to prevent this. It is an objectionable occurrence on account of noise and jar, especially where slide bars jump forward from zero positions. In my former patent above mentioned, I provide means to avoid this in the form of special pawls for engaging the slide bars. In the present instance I do away with the special pawls and utilize the pawls 24 which it will be remembered serve to normally restrain the slide bars by engaging in notches near the forward ends thereof. By normally is here meant the restraining, just as an itemizing operation starts, of slide bars in banks or rows of keys wherein none have been depressed. The fact is that as the machine stands at rest these pawls are not actually holding back the slide bars because the customary restoring bail for the slide bars is holding the latter. There is in fact a very slight advance of slide bars even though no key of associated banks or rows is depressed. The bail heretofore mentioned as comprising, the shaft 23 left side piece 192 and right side piece 51ᶜ, has a cross rod 192ᵃ which extends under all of the pawls 24 as shown in Figs. 42 to 47 in consequence of which when the total key is depressed and said bail there elevated as hereinbefore described, all of the pawls will be lifted so that in the ensuing operation of the machine the slide bars may be free to advance distances determined by the extent to which their adding wheels turn backward to the zero position. Now if this bail should remain elevated while the total key remains depressed and the handle started back, the racks upon release from the wheels would jump forward with their slide bars until the latter met the restoring bail unless some such special means as shown in my prior patent came into play. In the present instance provision is made for the automatic release of the bail notwithstanding the total key is kept depressed, so that the pawls 24 may drop and arrest the slide bars against any such forward movement. This is the reason for pivoting the blade 189 to the block 173ᵃ as before mentioned and loosely engaging said blade with the stud 171ᵃ to permit lateral movement. A spring 189ᵇ interposed between the blade 189 and the bell crank 171 normally holds the blade in line with the roller 191 but I have provided for an outward swing of the blade as illustrated in Fig. 49 as the handle reaches the forward end of its initial stroke. To this end I pivot upon an inwardly projecting stud 196 on the left side frame-piece of the machine, a horizontally arranged bell crank lever 195 bifurcated at its forward end to embrace the said blade 189 and to the other arm of said horizontal bell crank I join the forward end of a rod 194 which extends rearwardly and is jointed to one arm of another bell crank 193 loose upon the rock shaft 92 which supports the bail 91. The rearwardly extending arm of this bell crank 193 overlies an elongated roller stud 198 on a pendent bar 199 which is bifurcated to embrace a roller stud 173ᵃ on the link 173. A cam slotted segment 206 is secured to the rock shaft 12 and engages a skeleton rock frame 201 to oscillate the same. Said frame has a forward extension with a fork 200 whose lower prong normally clears the stud 198 as will be seen by reference to Figs. 14 and 15. However, when the total key is depressed the link 199 will be swung rearward as shown in Fig. 19 and the roller put in the path of said lower prong so that when the skeleton frame 201 is rocked the link 199 will be lifted as shown in Fig. 20. This upward movement of the link has a primary function hereinafter described and during the greater portion of the movement there is no effect produced upon the pawl releasing connections since normally the roller 198 is spaced from the bell crank 193. When, however, the cam 206 is completing its initial stroke, the stud 198 acts upon said bell crank and rocks it so as to in turn rock the horizontal bell crank 195 at the front of the machine, through the medium of a rod 194, and thereby throw the blade 189 outward releasing the bail 192 and causing the pawls 24 to reëngage the slide bars 1 and arrest any further forward movement thereof. To provide for effective engagement of the pawls whatever may be the position of the different slide bars, the latter are formed in their upper edges with series of notches 24ᵃ, there being a shoulder adjacent the forward notch of each slide bar, to provide for arrest of the slide bar in the zero position, it being remembered that the slide bars are held by their restoring bail originally so that there is very slight movement up to the pawls 24 when the latter are normally positioned in the forward notches, from which it follows that if the pawls are elevated by the total key as in Fig. 46 it would mean an exceedingly close working point to get the pawls back into the forward notches upon release of the bail 192. This accounts for the special formation of shoulders just back of the forward notches allowing sufficient clearance for the pawls in regaining an arresting position for slide bars in the zero position.

*Special printing to distinguish totals.*— The primary function of the link 199 is to shift a polychrome ink ribbon so that totals will be printed in a distinguishing color. Such a thing is provided for in my prior patent above mentioned as well as in my still earlier Patent 654,181, issued July 24, 1900, but in each of said prior constructions the shifting of the ribbon is done by the force of finger pressure upon the total key. It will have been noted that in the present construction the link 199 is operated from the drive shafts and merely set by depression of the total key. This relieves the latter of the burden of actually doing the shifting. Said link at its upper end is jointed to a crank arm 202 secured to a rock shaft 203, Fig. 1, and said rock shaft carries other crank arms 204, Fig. 5, connected by links 205 to sliding spool frames 206 in which are journaled ribbon spools 207. The ribbon 200 carried by said spools is of the polychrome type as indicated in Fig. 5 the forward half of the ribbon being represented as of different color from the rear half. The forward half normally extends over the area through which the positioned type pass when driven upwardly against the platen. It will be seen that through the connections described the operations of the machine with the total key depressed will cause the ribbon frames and spools to be shifted forward which will bring the rear division of the ribbon over this area thereby providing for the printing of the total in a distinguishing color.

*Printing mechanism.*—By reference to Figs. 21 to 29 it will be noted that there is secured to the upper part of each type carrying plate 2 a guide bar 140 grooved to accommodate type 140ᵃ the latter being shouldered above and below the guide strip to limit their movement. Rearward extensions of the guide bars 140 are notched as shown at 140ᵇ for alining purposes, the notches being spaced the same as the type. An alining blade 141 works in vertical slots of side frame pieces 143 of the printing section of the machine and is adapted to enter notches 140ᵇ as soon as types have been set by forward movement of the slide bars 1, and properly aline the type for printing an amount. The alining blade is carried by forwardly extending arms of bell crank levers 154 pivoted to said frame sides, see Figs. 1 and 2, the depending arms of said bell crank levers being slotted with cam formations near the lower ends. The slots are occupied by a cross rod 150 of a bail comprising side bars or links 151 connected at their lower ends to crank arms 152 secured to the shaft 12. It will be seen that when said shaft 12 oscillates as a result of pulling the handle forward the crank arms swing rearwardly pulling down the links 151 and the cross rod 150. During the greater portion of the stroke this rod simply travels in the slots of bell cranks 154 without affecting the same but as the end of the stroke is reached the cross rod strikes the cam formation in the slots and rocks the bell cranks forward and upward engaging the alining blade 141 with the notches of the bars 140. Then of course at the beginning of the return stroke the blade is withdrawn so that the type carriers may be restored to normal. The positioned type are driven to make the impression by hammer mechanism presently to be described. Before proceeding to describe that mechanism I shall point out means associated with the alining blade for effecting a positive restoration of type. Thin arms 166 are socketed at 168 in the said alining blade and at their forward ends these arms are pivoted on a rod 167 in bearings on a front frame piece of the printing section of the machine. There is one of these thin arms for each series of type, see Fig. 24, and they extend above the lower shoulders of the type between reduced portions thereof and the next adjacent type carrying plate or standard 2, as illustrated in Fig. 26. Obviously these thin arms move with the alining blade and first rise to leave the type free for their upward impression movement and then lower to restore the type.

The hammers before mentioned are designated by the numeral 146 and are independently journaled upon a cross rod 144, Fig. 21, portions in rear of said rod being notched as shown at 149 to receive lugs 148 on adjacent operating arms 147 also journaled upon the rod 144, the purpose of this sectional formation of the hammers being to provide for a percussive action of the hammer heads. The before mentioned cross rod 150, besides performing the function already explained, serves to normally restrain the hammers against the stress of springs 161 which connect the arms 147 with a portion of the frame work below, said rod normally upholding said arms 147 as shown in Fig. 21. The rod works in curved guiding slots in the side frame pieces 143 and moves the length of said slots and back in each operation of the machine. The hammers however are under control of latches or detents so that their release for impression purposes is controlled according to positioning of type carriers and is timed so as not to occur until the said type carriers have come to rest. Each of the hammer arms 147 has a lug 158 projecting to the left and normally above a shoulder 157 of a detent or trigger 156, the latter normally held forward by a spring 156ª and having a forwardly projecting arm extending alongside the associated type carrier 2. The latter has a stud 159 projecting to the left and normally occupying a notch 160 in the trigger or detent. Forward movement of the type carrier for type setting purposes causes said stud to cam the detent or trigger rearward thereby taking this shoulder 157 out of the path of the lug 158. This provides for individual control of the triggers by their respective type carriers. There is moreover a coöperative control for the purpose of cipher printing in a familiar manner. Each trigger has a laterally turned finger 162, see Fig. 27, which overlaps the neighboring trigger to the right with the result that all triggers to the right of that belonging to the highest order in which a digit appears, will be displaced whether or not there is type setting movement of type carriers. Then for the purposes of the present invention there is provision for displacing certain triggers in still another way. It is desirable in this class of machines to provide for indicating on the printed record whether or not at the beginning of a series of items, the accumulator was clear. That is done in the present instance by putting down the total key and operating the machine with the result that if the accumulator is clear at the time two ciphers will be printed in contrasting colors and without any preceding digit. It will be remembered that when the machine is operated with the total key depressed the ribbon frames 206 are moved forward. To the right hand one of these frames I couple a link 164, Fig. 5, which link at its rear end is coupled to a lever 165 pivoted to the right-hand side frame 143, Fig. 2, and having a laterally turned lower end extending through a slot in said frame piece. This laterally turned end of the lever constitutes a finger which is adapted upon movement of the lever produced by forward shifting of the ribbon frame, to act upon the two right-hand triggers 156 so that as the operation proceeds corresponding hammers will be released and will drive the two cipher types against the paper.

Referring now to the matter of timing the release of the hammers, they are first restrained, upon downward movement of the rod 150, by a detent blade 153 carried by arms 155 secured to a rock shaft 155ª and held forward by a spring 155ᵇ. Normally this blade 153 stands in the path of the rear ends of the arms 147 as shown in Fig. 21 and upon downward movement of the rod 150 these arms come to rest upon the blade as shown in Fig. 22. The arms 155 have cam edges near their lower ends as shown at 155ᶜ and as the rod 150 proceeds downward it operates upon these cam edges forcing the arms rearward and taking the blade 153 out of engagement with the arms 147 so that the latter may then spring downward as illustrated in Fig. 23 and the hammers may be driven against the type as also there illustrated. Downward movement of the arms 147 is limited by their contact with a cross bar 143ª extending between the side frames 143 and through slots in the arms 155 so as to also serve to limit the vibration of the latter.

The numeral 215 designates the roller platen which extends above the type and receives the impression, said roller platen being journaled as usual in a laterally shifting carriage.

*Driving mechanism.*—It is desirable in this class of machines not to have the primary drive shaft connected positively with the various moving parts of the somewhat complicated interior mechanism both in the interests of properly timing the movements of the parts and in order to protect them from injury or breakage should any hitch occur at any point. To this end the primary drive shaft 6 is connected to the counter shaft 12 by a distensible link comprising two overlapping members 55 and 56 pivoted respectively to the sector 53 and a crank arm 11 fastened to the shaft 12. Said members are slotted and a stud 57 on each engages a slot on the other. A relatively strong spring 58 is attached to posts 59 and 60 on the link members respectively and normally holds them at the shortest adjustment. It will thus be seen that forward movement of the drive sector 53 is transmitted to the crank arm 11 through the medium of the spring 58 and the shaft 12 and connected parts are protected against ill effects from violent jerking of the operating handle or excessive power applied to the shaft 6. Reverse oscillation of the latter is of course produced by the springs 9 and so in this connection it is proper that motion be imparted from the shaft 6 to the shaft 12 positively as by thrust of the forward stud 57 against the rear end of the slot in the link member 56 and thrust of the forward end of the slot in the link member 55 against the stud 57 on the link member 56. Speed of movement of the shaft 12 and connected parts is regulated by a dash-pot 85 of common form its cylinder being pivoted to the base of the machine and the stem of its piston jointed to a lever 88 which is connected by a link 87 to a crank arm 86 on the shaft 12. This shaft 12 besides carrying the operating arm 102 and the cam 206 and crank arms 152, has secured to it a pair of slotted cams 76 which engage rollers 77 on levers 13 pivoted at their upper ends to the frame work and at their lower ends to links 14 which extend forward to and unite with a cross bar 15 occupying slots in the slide bars 1, this crossbar and the links 14 constituting the restoring bail before mentioned as functioning to return the said slide bars to normal and normally hold them against the stress of their springs 5.

With the construction such as above described it is desirable if not practically essential to provide against the possibility of starting the primary shaft 6 on its return stroke until the secondary or counter shaft 12 has fully completed its initial stroke. To this end the devices illustrated in Figs. 50 to 54 are employed. A detaining pawl 61 is pivoted to the frame work at a point in front of the sector 53 and is connected by a spring 65 to a concentrically pivoted lever 64 the latter having a seat at its forward end for a cushion 63 that the right angle arm of the pawl 61 normally contacts as shown in Fig. 50. Mounted upon another fixed pivot is a trigger 69 whose shoulder just under its pivot is normally engaged by a laterally turned end of one arm 70 of the lever 64, the engagement being enforced by spring 69ª which connects a third branch of the lever 64 with the upper end of the trigger 69. The latter has a finger 68 which stands in the path of a lug 67 on the forward end of the link member 56. The sector 53 has a roller 66, which as the sector reaches the end of its forward or initial stroke wipes past the rear edge of the pawl 61 and seats itself in the notch or recessed end of the pawl which will then lock the sector against return unless or until the lug 67 strikes the finger 68 and disengages the trigger 69 from the lever arm 70 with such result as illustrated in Fig. 51. This cannot occur until the link member 56 has partaken of its full movement which of course means that the shaft 12 has partaken of its complete initial oscillation. Disengagement of the trigger 69 and lever arm 70 causes the lever 64 to swing on its pivot under actuation of the spring 69ª. This movement is limited by abutment against a cushion 72 in a seat provided at the lower end of the trigger 69. When the sector 53 executes its return stroke the roller 66 wipes past the under edge of the lever arm 70 and rocks it back to normal position where it is again caught and held by the trigger 69.

*Accumulator and carrying mechanism therefor.*—The adding gear 4 mesh with pinions 4ª of number wheels 4ᵇ the latter exhibiting the registration through a glass in the portion of the casing extending from the keyboard to the upper rear portion of the machine. These wheels and pinions are loose on a shaft 114 to which are secured side arms 116 of a bail whose cross rod 117 extends through slots of a series of carrying pawls 118 each separately pivoted to its own lever 125 and these levers being independently journaled upon a rock shaft 125ª and connected by springs 128 to a tubular shaft 126. The pawls are normally engaged with the gears 4 as illustrated in Fig. 14 inasmuch as any transfer actuations of said wheels occur at the very end of an operation of the machine and the resetting of transfer devices does not take place until the beginning of the next operation. The engagement and disengagement between these pawls and the wheels is controlled by a cam plate 120 which is secured to the shaft 125ª and has an irregular cam slot 119 which engages a roller on the end of the rod 117, see Fig. 1. The end portions of the slot are concentric with the shaft 125ª but the middle portion of the slot has a cam formation which stands ready to disengage the pawls from the wheels at the beginning of an operation. The cam plate 120 is connected by a link 207 with the skeleton rock frame 201 as shown in Figs. 1 and 14 and the shape of the cam slot in the cam segment 206 is such that just after the beginning of the stroke the said rock frame is given a quick short rearward movement sufficient to rock the cam plate 120 so as to disengage the pawls 118 from the wheels. The cam plate 120 forms the left side piece of a bail comprising a similar right side piece 129 and a cross rod 130 and the latter operates to restore any of the bail-carrying levers 125 which may have advanced in the preceding operation. The pawl-carrying arms or levers 125 are normally arrested by engagement of pivoted catches 124 thereon with restraining pawls or triggers 122 independently pivoted upon a cross rod 122ª, the engagement being enforced by springs 122ᵇ applied to said triggers. Transfer trip pawls in the form of escapement pallets 121 are also pivoted upon the cross rod 122ᶜ there being one of these trip pawls for each gear wheel 4 and each having a laterally projecting stud 123 to engage the inclined front end of the associated trigger 122 whenever there is to be a carry from a lower to a higher wheel. Under the arrangement here shown each of the gear wheels 4 has thirty teeth, the associated pinion 4ª having ten teeth, and therefore on each gear wheel 4 there are three equidistant tripping projections 115. These are V-shaped in cross section and the upper forward end of each transfer tripping pawl 121 is similarly shaped. The formation and relation of these parts is such that in forward rotation of a gear wheel 4 from a 9 registering postion to a zero registering position, the forward side of a V-shaped projection 115 will cam past the rear side of the V-shaped projection of the transfer tripping pawl 121 and rock the same causing its stud 123 to lift the trigger 122 disengaging it from the catch 124. This necessarily occurs during the back stroke of the operating handle when the bail rod 130 is retreating from the pawl-carrying arms or levers 125 consequently the latter whenever so released will spring forward unless otherwise restrained. However, in devices of this class it is necessary to guard against losing transfers by reason of the fact that a wheel to which a transfer is being made may itself be in motion for primary registration. To avoid any such happening which would of course mean erroneous registration, the actual transferring should be delayed until primary registering is over. Hence in the present construction it is provided that the pawl-carrying arms or levers 125 will not be fully released so as to permit action of the pawls upon the wheels until the operating handle is nearing the end of its return stroke when the racks have been disengaged from the wheels and of course the latter are no longer turning. The aforesaid tubular shaft 126 has a series of rearwardly extending fingers 127 and the arms 125 are shouldered for the engagement therewith of said fingers. The springs 128 are so applied to that tubular shaft as to tend to rock it in a direction to engage the fingers with the shoulders but normally these springs are restrained by the engagement with an upstanding finger 131 on said tubular shaft of a roller 120$^b$ on an upward extension of the cam plate 120, as shown in Fig. 14. Of course when said cam plate is rocked rearward as it is at the outset of an operation of the machine, the tubular shaft will rock so as to carry its fingers 127 down into line with the shoulders on the arms 125 as illustrated in Fig. 15 and therefore when the bail rod moves forward as the handle starts back, the levers 125 are arrested as in Fig. 18, and the tripping of a trigger 122 does not immediately result in release of the corresponding lever 125. It may be noted in this connection that the catches 124 are pivotally mounted and permitted a slight play by reason of having enlarged opening engaging studs on the arms 125, and there are springs 124$^c$ tending to swing the catches forward. The restoring bail rod 130 carries the arms 125 a little farther back than required to have the catches 124 clear the shoulders of the latches or triggers 122, as illustrated in Fig. 15. When the said bail rod starts forward the arms 125 follow up until the catches 124, after encountering the shoulders of the triggers 122, have partaken of the slight movement permitted them against the stress of their springs. It therefore results that when thereafter one of the triggers or latches 122 is lifted, the catch 124 can spring forward moving on its own pivot and so prevent the reëngagement with it of the latch.

It will be understood of course that at the last part of the return stroke of the handle the roller 120$^b$ strikes the finger 131 and rocks the tubular shaft 126 thereby disengaging the fingers 127 from the arms 125 whereupon the latter spring forward and cause their pawls to turn the higher wheels for effecting the transfer movements, the pawls having been engaged with the wheels during the latter part of the forward rocking of the cam plate 120.

One advantage of the particular construction above described is that wear on the trigger shoulders is minimized by reason of the fingers 127 taking the strain of the springs 128 during the return stroke of the handle, and thereby also the transfer mechanism is lightened in action.

The pallet form of transfer pawl is employed to guard against accidental carries by momentum. Thus if the projection 115 struck forcibly against the V-end of the pallet or escapement lever 121, tending to throw it, this would be prevented by abutment of the other end of the lever against another one of the projections 115, see Fig. 17.

*Accumulator lock.*—It is of course highly desirable to guard against any possible movement of the accumulator wheels except as produced either by movement of the racks or of the transfer actuating pawls. I therefore provide for securely locking the gear wheel 4 except when engaged either by the racks or said pawls. To this end a locking bar 132, Fig. 14, extends across in front of the wheels 4 and constitutes the cross bar of a bail whose side bars 133 are fastened to the rock shaft 108, Figs. 2 and 14. There are also united to this locking bar depending side arms 135 which at their lower ends are bifurcated for sliding engagement with the cross rod 91 of the before described rack raising and lowering bail. Normally the pawls 118 are engaged with the gear wheels 4 as hereinbefore mentioned and so lock said wheels and as the wheels should not be otherwise locked when said pawls do engage them, the bar 132 is not normally engaged with the wheels. It is held away from the same by reason of a projection or hump 136 of the cam plate 120, Fig. 15, engaging with a lug 137 on the left-hand side piece 133 of the transfer bail. Under these conditions the depending side arms 135 have the bases of their bifurcations raised above the cross rod 91 as shown in Fig. 14. A spring 133$^a$, Fig. 1, tends at all times to pull the locking bar 132 rearward into engagement with the gear wheels 4. Consequently when the cam plate 120 moves rearward at the outset of an operation the bar immediately engages and locks the wheels. This condition continues until at the end of the forward stroke of the operating handle the racks 3 are elevated into engagement with the gear wheels 4 which act causes the cross rod 91 to thrust the side arms 135 upward and disengage the locking bar 132 from the gear wheels as illustrated in Fig. 15.

*Line spacing mechanism.*—It is of course necessary to advance the roller platen 215 step by step in order that the machine will perform the usual work of listing a column of items. This may be done by ratchet and pawl mechanism similar to that shown in the patent to Treadway, 743,350, issued Nov. 3, 1904, and the reference numeral 215ª designates a swinging pawl-actuated bail such as that shown in said Treadway patent. In the present instance the cross rod of said bail is not merely acted upon by a single arm or finger as shown in the Treadway construction, but is embraced by a pair of jaws, one of which, 500, is rigidly fastened to the left one of the two operating levers 13, and the other of which slot, 501, is pivoted to said lever 13 and held against the first jaw by a connecting spring 502, see Fig. 1. Thus the bail 216 is given its initial stroke through a yielding connection and restored through positive action of the lever 13 though of course the lever itself is returned by the spring 9 after it has been given its initial stroke through the distensible link connection from the handle shaft 6 to the counter shaft 12.

*Ink ribbon feeding and reversing mechanism.*—My former Patent, 654,181, shows an ink ribbon feeding and reversing mechanism which that herein shown and described resembles to a considerable extent. However, it is an improvement upon the former construction in that the ink ribbon itself is no longer relied upon to effect by its tautness the reversal in the feeding mechanism. The ribbon spools which as before explained are in shiftable frames 206, have rotative and sliding engagement with shafts 209, Figs. 5, and 34, and these shafts carry ratchet wheels 209ª secured upon their forward ends, Fig. 35. A slide plate 209ᵇ is slotted to embrace said shafts and carries a swiveled disk 209ᶜ having studs 209ᵈ to alternately engage the feed pawls 209ᵉ which are pivoted concentrically on said disk as shown in Fig. 35 and spring pressed toward the ratchets respectively. This is substantially the same arrangement as shown in my said prior patent and as there the shifting of the disk disengages one pawl from its ratchet and reëngages the other pawl with its ratchet, a spring 209ᶠ coming into play to complete the shift of the disk and hold it in fully shifted position through the medium of a detaining pawl 209ᵍ. Reciprocations of the plate 209ᵇ effect the ribbon feed one way or the other according to which of the pawls 209ᵉ is engaged with its ratchet. The reciprocations of said plate are produced by reason of engagement therewith of a notched crank arm 88ª which is secured to a rock shaft 88ᵇ the latter having another crank arm 88ᶜ, Fig. 5, which is connected by a link 88ᵈ with a forward extension of the lever 88, Figs. 2 and 5. As a departure from the construction of my aforesaid patent I employ an additional plate 208 located in rear of the plate 209ᵇ and similarly slotted to embrace the shafts 209. This plate has a central downward projection 211 Fig. 34, with a slot 212 embracing the pawl pivot 213 which extends rearward for the purpose. This obviously effects a connection between the plates which will cause them to reciprocate together unless some means come into play to prevent this. Furthermore, it will be noted that a connection is established between the swiveled disk 209ᶜ and the back plate 208. It is through this connection that the said disk is shifted to reverse the feeding, instead of as before through the tautness of the ribbon when fully wound upon one spool and unwound from the other.

Ribbon control in the present construction is had through the medium of drags or brushes 221 secured to rock shafts 217 and formed at their free ends with substantially V-shaped portions 220 adapted to ride upon the ribbon and when the latter has been unwound, or just before, adapted to drop into recesses 219 of the spools. In Fig. 36 the left-hand brush or drag has so dropped into a recess by reason of that recess being uncovered through the unwinding of the ribbon from the spool. There are also secured to the rock shafts 217 dogs or pawls 216, Fig. 35, and springs 218 attached to said pawls tend to pull them down and operate to press the brushes or drags against the ribbon. In the upper edge of the plate 208 near opposite ends thereof are formed series of ratchet teeth 214 and 215 oppositely directed. The pawls 216 are adapted to alternately engage these ratchet teeth. Thus when the left hand drag or brush is lowered to the limit as illustrated in Fig. 36 the left hand pawl 216 becomes engaged with the ratchet teeth 214. This has the effect of locking the plate 208 against movement accompanying the return stroke of the crank arm 88ª in consequence of which the pivot pin 213 is detained and the return movement of the slide plate 209ᵇ will cause the disk 209ᶜ to shift and disengage the right hand pawl 209ᵉ from its ratchet wheel and engage the left hand pawl 209ᵉ with its ratchet wheel. Therefore the next stroke of the crank arm 88ᵃ will effect turning of the left hand ribbon spool in a direction to wind the ribbon thereon. The engagement between the drag 221 and this spool is such that this movement of the spool will lift the drag and consequently disengage the left hand pawl from the ratchet teeth 214.

I claim:

1. In a machine of the character described, the combination of depressible keys, detents therefor, a bail for collectively displacing the detents, means for actuating said bail comprising a rock piece, and a repeat key for setting the latter out of range of its actuating means; with provisions for blocking the repeat key by said rock piece when the latter is in operation; substantially as described.

2. In a calculating machine, the combination of adding wheels having cogs thereon, movable racks adapted under one condition to engage such adding wheels to rotate them, driving pawls adapted under another condition to engage such adding wheels to rotate them, and a retaining bar adapted to lock into the cogs of such adding wheels when they are not engaged by the racks or driving pawls.

3. In a calculating machine, the combination of adding wheels having cogs thereon, movable racks adapted under certain conditions to engage such adding wheels, driving pawls adapted under other conditions to engage such adding wheels, and a means under control of both the racks and pawls for engaging such adding wheels when the racks and pawls are disengaged therefrom.

4. In a calculating machine, the combination of accumulator wheels having cogs thereon, a bar normally lying across all said wheels with its edge between consecutive cogs thereof, thus locking the wheels against rotation, means to rotate said wheels for adding, carrying or taking totals, and means to remove the said bar from between the cogs thereof at such times as the wheels are engaged to be rotated.

5. In a machine of the character described, the combination of adding wheels with transfer projections; transfer actuator pawls; levers carrying said pawls; springs applied to said levers; transfer trip pawls; triggers actuated thereby; spring actuated catches on the said levers; a vibratory member to restrain the latter; means for intermittently operating said member; and a restoring bail to act on the levers; substantially as described.

6. In a machine of the character described, the combination of adding wheels with transfer projections; transfer actuator pawls; levers carrying said pawls; springs applied to said levers; transfer trip pawls in the form of pallets each with one arm adapted to confront one wheel-projection when another wheel-projection is immediately adjacent the other arm; triggers actuated by the said transfer pawls and normally restraining the levers; a detent member common to the latter; means for intermittently tripping said common detent; and means for restoring the pawl-carrying levers.

7. In a machine of the character described, the combination of movable type carriers, hammers for the type carriers respectively, triggers for restraining the hammers respectively and coöperating with the type carriers respectively to be disengaged thereby from the hammers, an auxiliary trigger disengaging device, and totaling mechanism coöperatively related to said device to impart movement thereto.

8. In a machine of the character described, the combination of movable type carriers, hammers for the type carriers respectively, triggers for restraining the hammers respectively and coöperating with the type-carriers respectively to be disengaged thereby from the hammers, an auxiliary trigger disengaging device, means for operating the latter, and totaling mechanism actuating said latter means.

9. In a machine of the character described, the combination of movable type carriers, hammers for the type carriers respectively, triggers for restraining the hammers respectively and coöperating with the type-carriers respectively to be disengaged thereby from the hammers, a vibratory finger adapted to act upon certain triggers, and totaling mechanism actuating said finger.

10. In a machine of the character described, the combination of movable type carriers, hammers for the type carriers respectively, triggers for restraining the hammers respectively and coöperating with the type-carriers respectively to be disengaged thereby from the hammers, a vibratory finger adapted to act upon certain triggers, totaling mechanism, and connections for operating the said fingers by said totaling mechanism.

11. In a machine of the character described, the combination of type carriers, setting-up devices, hammers, triggers, and a shiftable ribbon holder adapted to operate one or more triggers.

12. In a machine of the character described, the combination of type carriers, setting-up devices, hammers, triggers, universal hammer restraining means, means for displacing the latter, a shiftable ribbon holder, and means for displacing one or more triggers thereby.

13. In a machine of the character described, the combination of type carriers, means for positioning the same, a polychrome ink ribbon, means for shifting the same, totaling mechanism, controlling said shifting means, hammers normally retracted, triggers for the hammers respectively and disengaged therefrom by the type-carriers, and an auxiliary trigger displacing device controlled by the ribbon shifting means.

14. In a machine of the character described, the combination of type carriers, means for positioning the same, a polychrome ink ribbon, means for shifting the same, totaling mechanism controlling said shifting means, hammers normally retracted, triggers for the hammers respectively and disengaged therefrom by the type carriers, a trigger displacing finger, and a connection between the same and the ribbon shifting means.

15. In a machine of the character described, the combination of type carriers, means for positioning the same, a polychrome ink ribon, a shiftable carrier therefor, means for shifting the same, totaling mechanism controlling said shifting means, hammers normally retracted, triggers for the hammers respectively and disengaged therefrom by the type-carriers, a trigger-displacing finger, and an operating connection between the same and the ribbon-carrier.

16. In a calculating machine, a platen, a printing mechanism comprising carriers and type movable therein toward said platen, and means for positively restoring the type to normal position.

17. In a calculating machine, a platen, printing mechanism comprising type movable toward said platen, hammers adapted to strike said type, and drive them toward the platen, and means to positively withdraw said type from the platen.

18. In a calculating machine, a printing mechanism comprising notched type movable into printing position, a pivoted bar engaging the notches in the type to restore the type to normal position, and means connected to the bar to move it positively to restore the type.

19. In a calculating machine, a printing mechanism comprising type movable into printing position, an alining device, and means connected to the alining device for restoring the type to normal position.

20. In a calculating machine, a printing mechanism comprising type movable into printing position, an alining device, and a bar pivotally mounted adjacent the type at one end and connected to the alining device at its other end, the intermediate portion of the bar engaging the type.

21. In a calculating machine, a printing mechanism comprising type carriers, type carried thereby, and an alining device adapted to act upon said type carriers.

22. In a calculating machine, a printing mechanism comprising type carriers, notched type bars mounted thereon, type carried by the type bars, and an alining device directly engaging the notched type bars to aline the type.

23. In a calculating machine, a printing mechanism, comprising slotted side plates, sliding type carriers having at their upper ends notched type bars extending between the side plates, type carried by the type bars, an alining bar mounted in the slots in the side plates, bell crank levers pivoted on the side plates, one arm of said levers being secured to the alining bar, the other arm of the levers being provided with a cam slot, and means engaging the cam slots to operate the levers and thereby the alining bar.

24. In a machine of the character described, the combination of setting up devices, type carriers, impression means, polychrome ribbon carriage shiftable to present different ribbons to the type, a carriage shifting member, an actuating element normally disengaged from said shifting member, a total key and connections, and means for engaging said actuating element and the carriage member by setting of the total key, the carriage being thereafter shifted by said member.

25. In a machine of the character described, the combination of setting up devices, type carriers, impression means, polychrome ribbon carriage shiftable to present different ribbons to the type, a carriage shifting member, an actuating element normally disengaged from said shifting member, and a total key and connections coupled to the said carriage shifting member and adapted to engage the same with the said actuating element to be thereafter actuated for shifting the carriage.

26. In a machine of the character described, the combination of setting up devices, type carriers, impression means, polychrome ribbon carriage shiftable to present different ribbons to the type, carriage shifting means including a pivotal thrust link, an actuator element, and a total key and connections coupled to said thrust link and adapted to engage the same with said actuator element.

27. In a machine of the character described, the combination of setting up devices, type carriers, impression means, polychrome ribbon carriage shiftable to present different ribbons to the type, carriage shifting means including a pivotal thrust link with a stud, an oscillating actuator element having a jaw normally disengaged from said stud, and a total key and connections coupled to said thrust link and adapted to engage its stud with said jaw.

28. In a machine of the character described, the combination of adding wheels, reciprocatory actuators therefor, a reciprocating member for engaging and disengaging wheels and actuators, a pair of radius bars or links operatively connected to said member, an arm adapted to act alternately upon said radius links, and a total device and connections for engaging the arm with the links to reverse the order of engagement and disengagement between wheels and their actuators.

29. In a machine of the character described, the combination of adding wheels, reciprocatory actuators therefor, a reciprocating member for engaging and disengaging wheels and actuators, a pair of radius bars or links operatively connected to said member, an arm adapted to act alternately upon said radius links, and having a dog or pawl to act on the said radius links; and a total device and connections for engaging the dog with the links to reverse the order of engagement and disengagement between wheels and their actuators.

30. In a machine of the character described, the combination of adding wheels, reciprocatory actuators therefor, a reciprocating member for engaging and disengaging wheels and actuators, a pair of radius bars or links operatively connected to said member, an arm adapted to act alternately upon said radius links, and having a dog or pawl to act on the said radius links; and a total device and connections for engaging the dog with the links to change the periods of engagement and disengagement between wheels and actuators, said connections including a member normally restraining the dog.

31. In a machine of the character described, the combination of adding wheels, reciprocatory actuators therefor, a reciprocating member for engaging and disengaging wheels and actuators, a pair of radius bars or links operatively connected to said member, an arm adapted to act alternately upon said radius links, and having a dog or pawl to act on the said radius links; and a total device and connections for engaging the dog with the links to change the periods of engagement and disengagement between wheels and actuators, said connections including a member normally restraining the dog, and a guard normally preventing engagement between the dog and one of the radius links.

32. In a machine of the character described, the combination of adding wheels, actuators therefor, a reciprocating member for engaging and disengaging wheels and actuators, a pair of radius bars or links operatively connected to said member and having arms extending toward each other, an actuator arm adapted normally to act alternately upon the radius links, a dog or pawl on said arm adapted to act on the arms of said links; and a total key and connections adapted to effect engagement of the said dog with said arms.

33. In a machine of the character described, the combination of adding wheels, actuators therefor, a reciprocating member for engaging and disengaging wheels and actuators, a pair of radius bars or links operatively connected to said member and having arms extending toward each other, an actuator arm adapted normally to act alternately upon the radius links, a dog or pawl on said arm adapted to act on the arms of said links; and a total key and connections adapted to effect engagement of the said dog with said arms and including a member adapted to be acted upon by the dog for completing the setting of such total key.

34. In a machine of the character described, the combination of adding wheels, actuators therefor, a reciprocating member for engaging and disengaging wheels and actuators, a pair of radius bars or links operatively connected to said member and having arms extending toward each other, an actuator arm adapted normally to act alternately upon the radius links, a dog or pawl on said arm adapted to act on the arms of said links; and a total key and connections including a member normally preventing engagement of the dog with one of said arms.

35. In a machine of the character described, the combination of adding wheels, actuators therefor, a reciprocating member for engaging and disengaging wheels and actuators, a pair of radius bars or links operatively connected to said member and having arms extending toward each other, an actuator arm adapted normally to act alternately upon the radius links, a dog or pawl on said arm adapted to act on the arms of said links; and a total key and connections including a member normally preventing engagement of the dog with one of said arms and a bell crank coupled to said member and acted upon by the dog when the total key is partially depressed.

36. In a machine of the character described, the combination of adding wheels, actuators therefor, a reciprocating member, for engaging and disengaging wheels and actuators, a pair of radius bars or links operatively connected to said member and having arms extending toward each other, an actuator arm adapted normally to act alternately upon the radius links, a dog or pawl on said arm adapted to act on the arms of said links; and a total key and connections including a member normally preventing engagement of the dog with one of said arms and a guard normally preventing engagement between the dog and the other of said arms.

37. In a machine of the character described, the combination of adding wheels, reciprocatory actuators therefor spring-drawn in one direction, manipulative means for variously limiting excursions of said actuators, detents normally restraining the actuators and adapted to be severally displaced by said manipulative means, means for effecting engagement of wheels and actuators during movement of the latter in one direction and disengagement thereof during movement of said actuators in the opposite direction, and totaling devices for reversing the order of engagement and disengagement of wheels and actuators with provisions for collectively displacing the aforesaid detents and holding them displaced during movement of the actuators while engaged with the wheels and reëngaging the detents with the actuators upon disengagement thereof from the wheels.

38. In a machine of the character described, the combination of adding wheels, reciprocatory actuators therefor spring-drawn in one direction, manipulative means for variously limiting excursions of said actuators, detents normally restraining the actuators and adapted to be severally displaced by said manipulative means, means for effecting engagement of wheels and actuators during movement of the latter in one direction and disengagement thereof during movement of said actuators in the opposite direction, and totaling devices for reversing the order of engagement and disengagement of wheels and actuators with provisions for collectively displacing the aforesaid detents and holding them displaced during movement of the actuators while engaged with the wheels and reëngaging the detents with the actuators upon disengagement thereof from the wheels, said provisions including a bail engaged with the detents, a lifter for said bail and means for disabling the lifter.

39. In a machine of the character described, the combination of adding wheels, reciprocatory actuators therefore spring-drawn in one direction, manipulative means for variously limiting excursions of said actuators, detents normally restraining the actuators and adapted to be severally displaced by said manipulative means, means for effecting engagement of wheels and actuators during movement of the latter in one direction and disengagement thereof during movement of said actuators in the opposite direction, and totaling devices for reversing the order of engagement and disengagement of wheels and actuators with provisions for collectively displacing the aforesaid detents and holding them displaced during movement of the actuators while engaged with the wheels and reëngaging the detents with the actuators upon disengagement thereof from the wheels, said provisions including a bail engaged with the detents, a rocking cam piece for lifting the bail and movable laterally to disengage it from the bail, and a reciprocating member for so moving the cam piece laterally.

40. In a machine of the character described, the combination of adding gears; reciprocating racks therefor spring-drawn and having stop shoulders; series of amount keys; rack restoring mechanism; detents normally positioned for holding back the racks when said restoring mechanism releases the latter and adapted to be severally tripped by the different series of amount keys; means for effecting disengagement between gears and racks during movement thereof by their springs and engagement during movement by the restoring mechanism; zero stops to limit backward turning of the gears; and a total key and connections for effecting engagement between the gears and racks during the initial or spring movement thereof, said connections including means for collectively tripping the detents; the latter adapted to engage the aforesaid shoulders of the racks to check further spring-movement thereof when the gears and racks are disengaged by restoration of the total key and connections to normal with the gears at zero.

41. In a machine of the character described, the combination of adding gears; reciprocating racks therefor spring-drawn and having series of stop shoulders; series of amount keys; rack restoring mechanism; detents normally positioned for holding back the racks when said restoring mechanism releases the latter and adapted to be severally tripped by the different series of amount keys; means for effecting disengagement between gears and racks during movement thereof by their springs and engagement during movement by the restoring mechanism; zero stops to limit backward turning of the gears; and a total key and connections for effecting engagement between the gears and racks during the initial or spring movement thereof, said connections including means for collectively tripping the detents; the latter adapted to engage the aforesaid shoulders of the racks to check further spring-movement thereof beyond varying positions to which they have advanced as controlled by the backward turning of the gears to zero.

42. In a machine of the character described, the combination of a primary drive shaft; a secondary drive shaft; a distensible spring-link connection cranked to said shafts; a spring-held detent adapted to detain the primary shaft at the limit of its initial oscillation; a spring-actuated detent-displacing member; and a spring-held trigger normally restraining said member and adapted to be tripped by the link connection; the primary drive shaft adapted in its return oscillation to restore the detent displacing member to engagement with the trigger.

43. In a machine of the character described, the combination of a primary drive shaft; a secondary drive shaft; spring-connected link-members cranked to said shafts respectively and slidingly engaged with each other; a spring-held detent adapted to detain the primary shaft at the limit of its initial oscillation; a spring-actuated detent-displacing member; and a spring-held trigger normally restraining said member and adapted to be tripped by the link member which is cranked to the secondary drive shaft; the primary drive shaft adapted in its return oscillation to restore the detent displacing member to engagement with the trigger.

44. In a machine of the character described, the combination of a primary drive-shaft; a secondary drive-shaft; a distensible spring link connection cranked to said shafts; a spring-held bell crank detent adapted to detain the primary shaft at the limit of its initial oscillation; a spring-actuated lever concentric with said detent and engaged with one of its arms; and a spring-held trigger normally detaining said lever and adapted to be tripped by the aforesaid spring link connection.

45. In a machine of the character described, the combination of a primary drive-shaft; a secondary drive-shaft; a distensible spring link connection cranked to said shafts; a spring-held bell crank detent adapted to detain the primary shaft at the limit of its initial oscillation; a spring-actuated lever concentric with said detent and engaged with one of its arms; and a spring-held trigger normally detaining said lever and adapted to be tripped by the aforesaid spring link connection and presenting a stop to limit the spring movement of said lever.

FRANK C. RINSCHE.

Witnesses:
WARREN L. HOAGLAND, Jr.,
CARL H. L. FLINTERMANN.